US012618980B2

(12) United States Patent
Yu et al.

(10) Patent No.: US 12,618,980 B2
(45) Date of Patent: May 5, 2026

(54) AGGREGATED VECTOR AND CLOCK TRACKING IN A GNSS RECEIVER

(71) Applicant: Deere & Company, Moline, IL (US)

(72) Inventors: Wei Yu, Torrance, CA (US); Richard G. Keegan, Irvine, CA (US); David Man Kui Li, Harbor City, CA (US); Mark P. Kaplan, Culver City, CA (US); Brian C. Goodrich, Torrance, CA (US)

(73) Assignee: Deere & Company, Moline, IL (US)

( * ) Notice: Subject to any disclaimer, the term of this patent is extended or adjusted under 35 U.S.C. 154(b) by 710 days.

(21) Appl. No.: 17/966,679

(22) Filed: Oct. 14, 2022

(65) Prior Publication Data

US 2023/0213658 A1 Jul. 6, 2023

Related U.S. Application Data

(60) Provisional application No. 63/295,429, filed on Dec. 30, 2021.

(51) Int. Cl.
*G01S 19/20* (2010.01)
*G01S 19/29* (2010.01)
(Continued)

(52) U.S. Cl.
CPC .............. *G01S 19/20* (2013.01); *G01S 19/29* (2013.01); *G01S 19/37* (2013.01); *H04L 25/0204* (2013.01); *H04W 56/003* (2013.01)

(58) Field of Classification Search
CPC ......... G01S 19/20; G01S 19/29; G01S 19/37; H04L 25/0204; H04L 25/0222; H04W 56/003
See application file for complete search history.

(56) References Cited

U.S. PATENT DOCUMENTS

| | | | |
|---|---|---|---|
| 5,293,402 | A | 3/1994 | Crespo et al. |
| 5,663,733 | A | 9/1997 | Lennen |

(Continued)

FOREIGN PATENT DOCUMENTS

WO WO2020059219 A1 3/2020

OTHER PUBLICATIONS

"Phase Lock Loop (PLL)" Navipedia. Retrieved from https://gssc.esa.int/navipedia/index.php/Phase_Lock_Loop_(PLL) (Year: 2011).*

(Continued)

*Primary Examiner* — Jack W Keith
*Assistant Examiner* — John Bishoy Sam Abraham
(74) *Attorney, Agent, or Firm* — Morgan, Lewis & Bockius LLP

(57) ABSTRACT

A system for navigating a mobile object receives satellite navigation signals from a plurality of satellites. Using one or more of the satellite navigation signals from the plurality of satellites, for each respective channel of a plurality of channels, the system generates an estimate of clock error of a clock of the mobile object using a first error correction stage and generates an estimate of a respective carrier tracking error for the respective channel using a second error correction stage that is distinct from the first error correction stage. In accordance with the estimate of the clock error and the estimate of the respective carrier tracking error for each of the plurality of channels, the system computes position and velocity estimates for the mobile object. The system performs a navigation function for the mobile object in accordance with the computed position and velocity estimates for the mobile object.

16 Claims, 14 Drawing Sheets

(51) Int. Cl.

| | |
|---|---|
| G01S 19/37 | (2010.01) |
| H04L 25/02 | (2006.01) |
| H04W 56/00 | (2009.01) |

(56) References Cited

U.S. PATENT DOCUMENTS

| | | | | |
|---|---|---|---|---|
| 6,512,479 | B1 | 1/2003 | Sahai et al. | |
| 6,516,021 | B1* | 2/2003 | Abbott | G01S 19/26 |
| | | | | 375/150 |
| 7,499,485 | B2 | 3/2009 | Cho | |
| 8,013,789 | B2 | 9/2011 | Van Graas et al. | |
| 9,063,224 | B2 | 6/2015 | De Latour | |
| 2003/0189975 | A1 | 10/2003 | Fullerton | |
| 2004/0176034 | A1 | 9/2004 | Hunter et al. | |
| 2006/0133551 | A1 | 6/2006 | Davidoff et al. | |
| 2007/0118286 | A1* | 5/2007 | Wang | G01S 19/47 |
| | | | | 342/357.65 |
| 2010/0118921 | A1 | 5/2010 | Abdelmonem et al. | |
| 2010/0141520 | A1 | 6/2010 | Ghinamo et al. | |
| 2010/0208775 | A1* | 8/2010 | Weill | G01S 19/37 |
| | | | | 375/150 |
| 2011/0007783 | A1* | 1/2011 | Weill | G01S 19/254 |
| | | | | 375/150 |
| 2011/0216910 | A1 | 9/2011 | Lee | |
| 2015/0301188 | A1* | 10/2015 | Broderick | G01S 19/23 |
| | | | | 342/357.68 |
| 2017/0180160 | A1 | 6/2017 | Moorti et al. | |
| 2017/0343677 | A1 | 11/2017 | Capet et al. | |
| 2020/0295849 | A1 | 9/2020 | Li | |
| 2020/0334542 | A1 | 10/2020 | Hoydis | |
| 2022/0276389 | A1 | 9/2022 | Yu et al. | |

OTHER PUBLICATIONS

Deere & Company, PCT/US2022/076201, International Search Report and Written Opining, Feb. 21, 2023, 23 pgs.

Andrea Di Cintio et al., "The Grehda Project: Galileo Software Receiver for High Dynamic Applications", GNSS 2007—Proceedings of the 20th International Technical Meeting of the Satellite Division of the Institute of Navigation (ION GNSS 2007), The Institute of Navigation, 8551 Rixlew Lane, Suite 360, Manassas, VA 20109, Sep. 28, 2007 (Sep. 28, 2007), pp. 2376-2387, XP056010081, 10 pgs.

Changhui Jiang et al., "Research on a chip scale atomic clock aided vector tracking loop", IET Radar, Sonar & Navigation, ISSN 1751-8784, Received on Oct. 25, 2018, Revised Feb. 18, 2019, Accepted on Mar. 14, 2019, E-First on Apr. 30, 2019, 6 pgs. doi: 10.1049/iet-rsn.2018.5523.

Deere & Company, PCT/US2022/076187, International Search Report and Written Opining, Apr. 1, 2023, 22 pgs.

Shuai Jing et al., Weak and Dynamic GNSS Signal Tracking Strategies for Flight Missions in the Space Service Volume, Sensors, Sep. 2, 2016, pp. 1-19, doi:10.3390/s16091412.

Frank Van Graas et al., Closed-Loop Sequential Signal Processing and Open-Loop Batch Processing Approaches for GNSS Receiver Design, IEEE Journal of Selected Topics in Signal Processing, vol. 3, No. 4, Aug. 2009, published on Jul. 17, 2009, pp. 571-586, 16 pgs.

Frank Van Graas et al., Comparison of Two Approaches for GNSS Receiver Algorithms: Batch Processing and Sequential Processing Considerations, ION GNSS 18th International Technical Meeting of the Satellite Division, Sep. 13-16, 2005, pp. 200-211.

Davide Rovelli et al., Acquisition Speed Up Engine for GNSS Signals, retrieved from internet on Mar. 24, 2022, pp. 1-8.

Yuheng Yang et al., A Novel VLSI Architecture for Multi-Constellation and Multi Frequency GNSS Acquisition Engine, published on Dec. 19, 2018, pp. 655-665.

Hongyang Zhang et al., A 2-step GPS carrier tracking loop for urban vehicle applications, Journal of Systems Engineering and Electronics, vol. 28, No. 5, Oct. 2017, pp. 817-826, 10 pgs, DOI: 10.21629/JSEE.2017.05.01.

Pablo E. Leibovich et al., Dedicated Hardware for FFT Based Fast Acquisition of GNSS Signals, retrieved from internet on Mar. 24, 2022, pp. 1-4.

Andrey Soloviev et al., Utilizing Batch Processing for GNSS Signal Tracking, ION Canada 2007 Batch Processing, Feb. 27, 2007, pp. 1-40, [online]. Retrieved from the Internet <URL: http://alberta.ion.org/wp-content/uploads/2007/02/07.02.27-AndreySoloviev-Batch-Processing-for-GNSS-Signal-Tracking.pdf>.

* cited by examiner

900

900

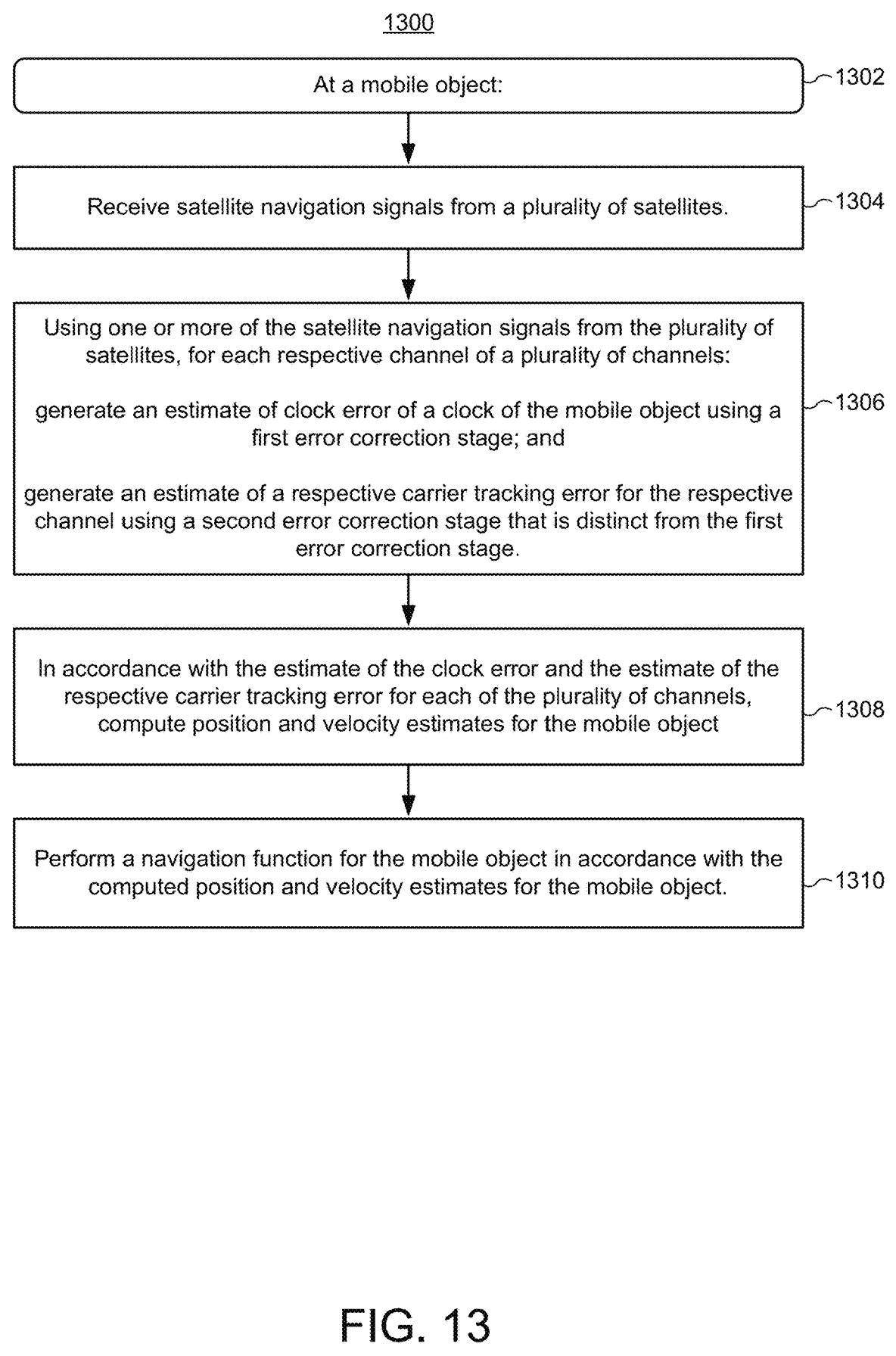

1300

At a mobile object: — 1302

Receive satellite navigation signals from a plurality of satellites. — 1304

Using one or more of the satellite navigation signals from the plurality of satellites, for each respective channel of a plurality of channels:

generate an estimate of clock error of a clock of the mobile object using a first error correction stage; and generate an estimate of a respective carrier tracking error for the respective channel using a second error correction stage that is distinct from the first error correction stage. — 1306

In accordance with the estimate of the clock error and the estimate of the respective carrier tracking error for each of the plurality of channels, compute position and velocity estimates for the mobile object — 1308

Perform a navigation function for the mobile object in accordance with the computed position and velocity estimates for the mobile object. — 1310

FIG. 13

AGGREGATED VECTOR AND CLOCK TRACKING IN A GNSS RECEIVER

RELATED APPLICATION

This application claims priority to U.S. Provisional Application No. 63/295,429, filed Dec. 30, 2021, which is incorporated herein by reference in its entirety.

TECHNICAL DATA FIELD

The disclosed embodiments relate generally to satellite communications. More particularly, the disclosed embodiments relate to clock and carrier signal tracking in a GNSS receiver.

BACKGROUND

Receivers in global navigation satellite systems (GNSS's), such as the Global Positioning System (GPS), use range measurements that are based on line-of-sight signals from satellites. The signal strength of the satellite signals received by a GNSS receiver is weak, approximately $10^{-16}$ watts, and also suffers from a variety of errors. One error, referred to below as a "clock error," results from the fact that GNSS receivers typically use a crystal clock that is less accurate than the atomic clocks typically used by GNSS transmitters. In addition, GNSS satellites transmit at a carrier frequency that undergoes a number of distortions, including a line-of-sight Doppler shift due to the relative motion between the GNSS transmitter (i.e., the satellite) and the GNSS receiver (i.e., the mobile object). These distortions must be accounted for, in a process known as carrier tracking, in order to accurately reproduce the satellite's data signal.

SUMMARY

Some embodiments of the present disclosure provide systems and methods for navigating a mobile object according to signals from satellites. In some embodiments, the mobile object receives and processes GNSS satellite signals, sometimes herein called satellite navigation signals or satellite signals, from a plurality of satellites, using a plurality (e.g., a corresponding number) of different signal processing channels, sometimes herein called channels. For each signal processing channel, errors in the carrier phase (e.g., of a locally produced replica of a corresponding satellite signal) are measured and accumulated. These errors are used both for correcting the clock error and for carrier tracking. For example, an inertial measurement unit (IMU) or velocity estimate for the mobile object is used to estimate and account for a line-of-sight Doppler error, a common remaining error (across multiple channels) is used to determine a clock error, and a remainder for each individual channel is used for carrier tracking.

Because the clock error is estimated using the signals from multiple channels (which could correspond to as few as four channels, but more typically 8 or more channels, and potentially tens or even hundreds of channels), it is possible and often beneficial to correct the clock error more often than the carrier signal (e.g., every millisecond as opposed to every five milliseconds). When a single stage of demodulation is used to correct both errors, correcting the clock error at a faster rate than that of the carrier signal results in the two signals drifting in opposite directions, because corrections to the clock error are effectively counted multiple times. This typically would not adversely impact GNSS receiver performance as long as the receiver has enough allocated memory to store the two corrections. When implemented in software, allocating sufficient memory is typically not a problem, as memory can be reallocated on-demand. However, if a single stage of signal demodulation and correlation accumulation hardware is used to control both a clock NCO (numerically controlled oscillator) and channel carrier NCO, but with different iteration/update rates for the clock and channel carrier update loops, the opposite drift of the clock NCO and the channel carrier NCO can adversely affect operation of the GNSS receiver.

To that end, a method is provided for navigating a mobile object according to signals from satellites using a dual-stage error correction scheme, in which the corrected clock signal is intentionally not accounted for in tracking the carrier signal (e.g., to avoid multiple counting). The method is performed at the mobile object (e.g., by a navigation module at the mobile receiver, where the navigation module includes a satellite receiver to receive satellite navigation signals from a plurality of satellites). The method includes receiving satellite navigation signals from a plurality of satellites. The method includes, for each respective channel of a plurality of channels, processing a corresponding satellite navigation signal of the received satellite navigation signals, the processing of the corresponding satellite navigation signal including: generating an estimate of clock error of a clock of the mobile object using a first error correction stage of the respective channel; and generating an estimate of a respective carrier tracking error for the respective channel using a second error correction stage of the respective channel that is distinct from the first error correction stage of the respective channel. Each channel (e.g., using a channel tracking loop) processes a corresponding satellite navigation signal of the received satellite navigation signals. The method includes in accordance with the estimate of the clock error and the estimate of the respective carrier tracking error for each of the plurality of channels, computing position and velocity estimates for the mobile object. The method includes performing a navigation function for the mobile object in accordance with the computed position and velocity estimates for the mobile object.

It is noted that each channel of the plurality of channels is typically used to maintain lock or synchronization with a different satellite navigation signal. For example, for a set of N satellites in view of the mobile object, each satellite transmitting having two satellite navigation signals (e.g., on two different frequencies), 2N of the channels would be used to maintain lock or synchronization with the signals from those N satellites.

Further, a navigation module for a mobile object is provided. The navigation module includes one or more processors, a satellite receiver to receive satellite navigation signals from a plurality of satellites, and a plurality of channel tracking loops. Each channel tracking loop of the plurality of channel tracking loops corresponds to a respective channel of a plurality of channels and includes a first error correction stage and a second error correction stage. Each channel tracking loop processes a corresponding satellite navigation signal of the received satellite navigation signals and is configured to: generate an estimate of clock error of a clock of the mobile object using a first error correction stage of the respective channel; and generate an estimate of a respective carrier tracking error for the respective channel using a second error correction stage of the respective channel that is distinct from the first error correction stage of the respective channel. The navigation module for the mobile object further comprises a navigation application module configured to: in accordance with the estimate of the clock error and the estimate of the respective carrier tracking error for each of the plurality of channels, compute position and velocity estimates for the mobile object; and perform a navigation function for the mobile object in accordance with the computed position and velocity estimates for the mobile object.

Thus, improved systems and methods for navigating a mobile object are provided, particularly with respect to carrier and clock tracking.

BRIEF DESCRIPTION OF THE DRAWINGS

FIG. 13 depicts a flowchart of a method for navigating a mobile object according to signals from satellites, according to some embodiments.

DESCRIPTION OF EMBODIMENTS

Figure 1:
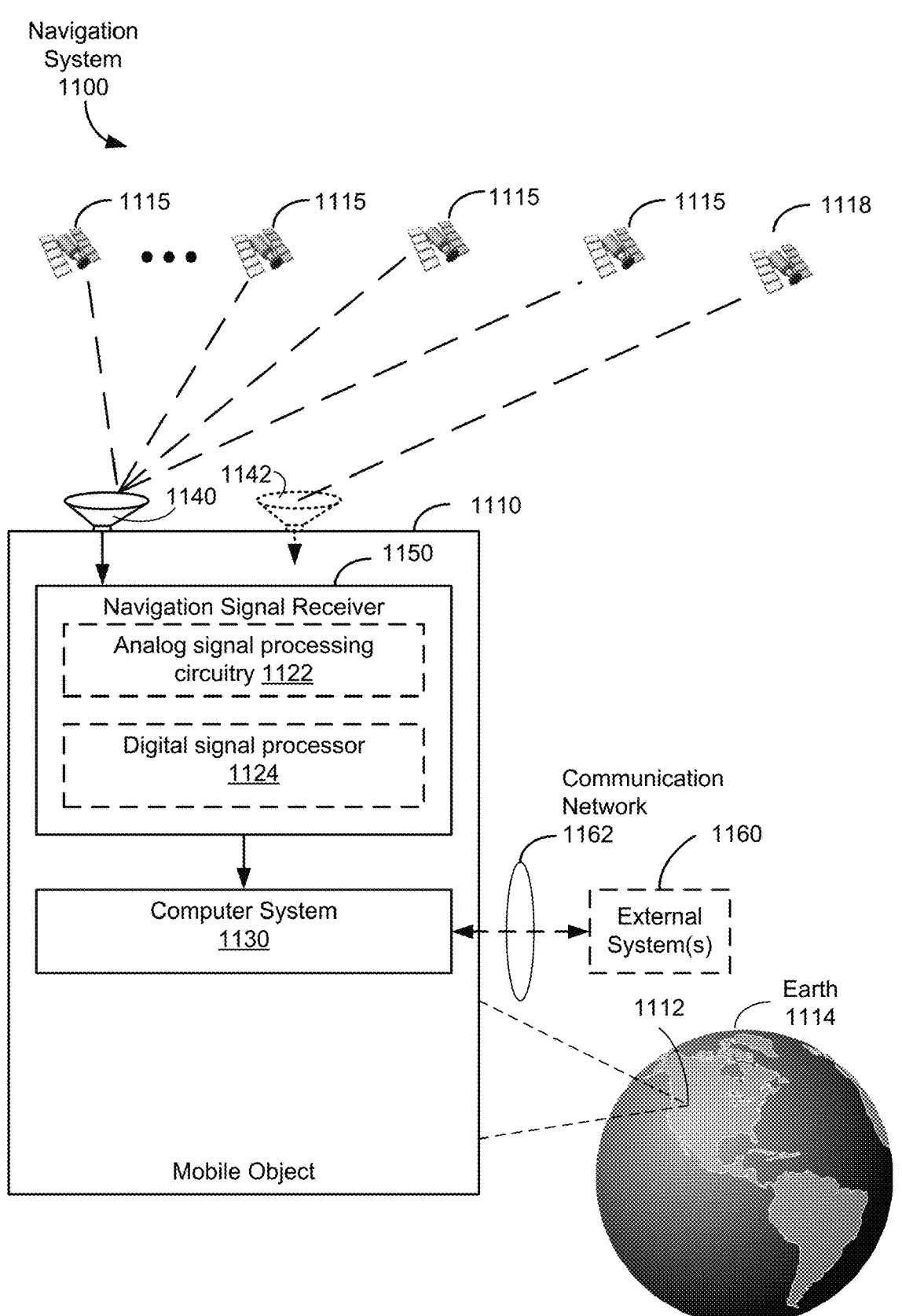
FIG. 1 is a block diagram illustrating a navigation system, according to some embodiments.

FIG. 1 is a block diagram illustrating a navigation system 1100, according to some embodiments. Navigation system 1100 enables a mobile object 1110 (e.g., a phone, specialized GNSS receiver, a boat, a truck or other vehicle, a farming appliance, mining appliance, drilling system, etc.) to determine, at any point of time, its current position 1112 with respect to a global coordinate system (e.g., a coordinate system for Earth 1114). Mobile object 1110 is equipped with a satellite receiver (navigation signal receiver 1120), typically including or coupled to one or more satellite antennas 1140, to receive satellite navigation signals from at least four satellites 1115 that are orbiting Earth. The satellite navigation signals received by mobile object 1110 are typically global navigation satellite system (GNSS) signals from satellites that are "in view" (e.g., above the horizon) of the mobile object. Tables 1-2 below provide examples of GNSS signals from exemplary GNSS systems.

TABLE 1

| Signal Type | PRN Period (ms) | T Data/SC Period (ms) | PRN Length (chips) | Chipping Rate (MCPS) |
|---|---|---|---|---|
| GPS-C/A | 1 | 20 | 1023 | 1.023 |
| GPS-L1C | 10 | 10 | 10230 | 1.023 |
| BD-B1I | 1 | 1 | 2046 | 2.046 |
| BD-B1C | 10 | 10 | 10230 | 1.023 |
| GAL-E1B | 4 | 4 | 4092 | 1.023 |
| GAL-E1C | 4 | 1 | 4092 | 1.023 |
| GLN-G1C | 1 | 10 | 511 | 0.511 |

TABLE 2

| Signal Type | Modulation Type | Req Fs (MHz) |
|---|---|---|
| GPS-C/A | BPSK | 2.046 |
| GPS-L1C | TMBOC(6, 1, 1/11) | 4.092 |
| BD-B1I | BPSK | 4.092 |
| BD-B1C | BOC(1, 1) | 4.092 |
| GAL-E1B | CBOC(6, 1) | 4.092 |
| GAL-E1C | CBOC(6, 1)-c | 4.092 |
| GLN-G1C | BPSK | 4.092 |

In Tables 1-2 above, signal type refers to the various signals provided by the various GNSS systems (e.g., GPS-C/A is the GPS coarse acquisition signal), PRN period is the length of time for a complete instance of the PRN code (in milliseconds), T is the length of time, in milliseconds, over which a single bit of data is encoded (in milliseconds), and is also the minimum length of time between signal value transitions due to either secondary code (SC) modulation or data modulation or both, PRN length is the number of chips in a complete instance of the PRN code, the chipping rate is the rate at which the chips are transmitted (in millions of chips per second (MCPS)), and Req Fs is the required sampling frequency (per Nyquist theorem). The rate at which the chips are transmitted may differ from the rate at which they are received based on, e.g., Doppler shift and other effects.

In some embodiments, mobile object 1110 also receives satellite orbit correction information and satellite clock correction information (sometimes collectively called "correction information") for the plurality of satellites. The correction information is typically broadcast by and received from one or more satellites 1118 distinct from the GNSS satellites 1115, using an antenna 1142 and signal receiver(s) 1152 (see FIG. 2) distinct from satellite antenna 1140 and receiver 1150 used to receive the satellite navigation signals. However, in some embodiments, the same antenna and receiver are used to receive both satellite navigation signals and correction information.

Mobile object 1110 determines a position of mobile object 1110, using the received satellite navigation signals, and optionally the received satellite orbit correction information and satellite clock correction information, for the plurality of satellites. In some embodiments, received satellite navigation signals are processed by navigation signal receiver 1120, including analog signal processing circuitry 1122 and a digital signal processor 1124, taking into account the correction information, to determine code measurements and phase measurements for signals received from four or more satellites 1115. In some embodiments, each distinct signal received from a satellite is processed using a different channel. Stated another way, the distinct signals received from each distinct satellite are each processed using a different channel, each of which includes a channel tracking loop. Since a single GNSS receiver may be tracking multiple signals, from multiple (e.g., four or more) satellites, from one or more (e.g., multiple) constellations of satellites, the GNSS receiver may be processing tens or hundreds of satellite signals at any given time. Embedded computer system 1130 determines the position of mobile object 1110 based on those measurements.

Figure 2:
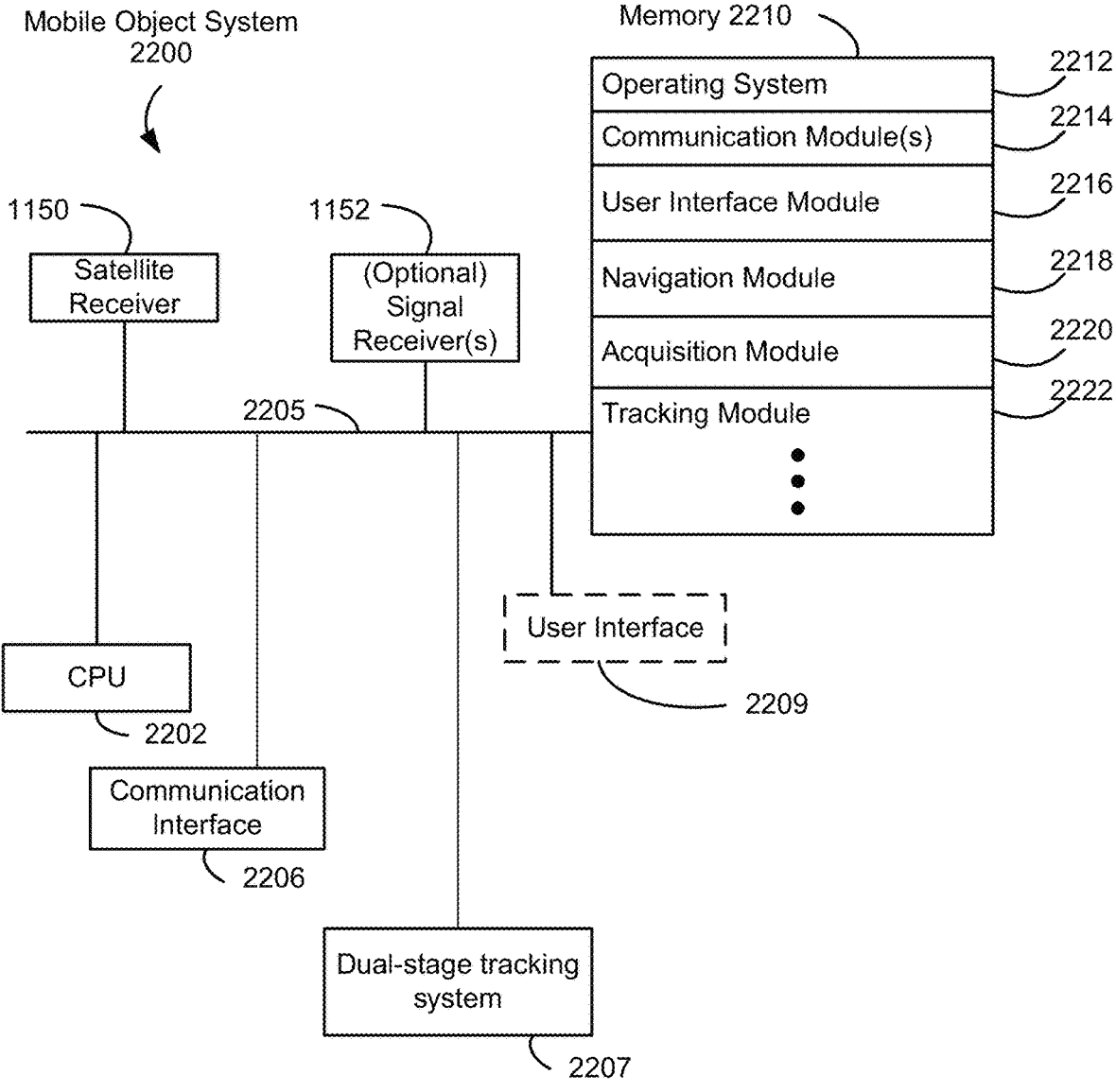
FIG. 2 is a block diagram illustrating a mobile object system, corresponding to the mobile object of FIG. 1, according to some embodiments.

FIG. 2 is a block diagram of a mobile object system 2200 (e.g., a navigation module for the mobile object) that is located in or on or is co-located with, and used by, a mobile object 1110 (see FIG. 1) to determine the position of the mobile object 1110, according to some embodiments.

Mobile object system 2200 typically includes one or more hardware processors (e.g., CPUs) 2202 for executing programs or instructions; memory 2210; one or more communications interfaces 2206; and one or more communication buses 2205 for interconnecting these components. Mobile object system 2200 optionally includes a user interface 2209 comprising a display device and one or more input devices (e.g., one or more of a keyboard, mouse, touch screen, keypad, etc.) coupled to other components of mobile object system 2200 by the one or more communication buses 2205. Satellite receiver 1150 receives satellite navigation signals from a plurality of satellites 1115 (FIG. 1) and is coupled to other components of mobile object system 2200 by the one or more communication buses 2205. The one or more communication buses 2205 may include circuitry (sometimes called a chipset) that interconnects and controls communications between system components.

Communication interface 2206 (e.g., a transceiver) is used by mobile object system 2200, and more generally by mobile object 1110, to convey information to external systems, and to receive communications from external systems. Optionally, one or more additional signal receivers 1152 are included in mobile object system 2200 to receive correction information broadcast by one or more satellites 1118 (FIG. 1).

Memory 2210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 2210 optionally includes one or more storage devices remotely located from the CPU(s) 2202. Memory 2210, or alternately the non-volatile memory device(s) within memory 2210, comprises a computer readable storage medium. In some embodiments, memory 2210 or the computer readable storage medium of memory 2210 stores the following programs, modules and data structures, or a subset thereof:

- an operating system 2212 that includes procedures for handling various basic system services and for performing hardware dependent tasks;
- a communications module 2214 that operates in conjunction with communication interface 2206 (e.g., a receiver and/or transceiver) to handle communications between mobile object 1110 and external systems 1160 (FIG. 1); the connection between mobile object system 2200 and external systems 1160 may include a communication network 1162, such as the internet or a public or proprietary wireless network;

- a user interface module 2216 for receiving information from one or more input devices 2213 of user interface 2209, and to convey information to a user of mobile object 1110 via one or more display or output devices 2211;
- a navigation module 2218 for determining a position of the mobile object 1110 (e.g., computing position and velocity estimates for the mobile object and performing navigation functions for the mobile object 1110) in accordance with the computed position and velocity estimates for the mobile object);
- an acquisition module 2220 for acquiring satellite signals from GNSS satellites, including determining a tracking frequency and a code shift (sometimes called a code offset) for each of several respective GNSS satellites; and
- a tracking module 2222, sometimes called the satellite signal tracking module, which tracks GNSS satellite signals (e.g., using a plurality of channels) using acquisition information (e.g., the tracking frequency and code shift) handed over from the acquisition module 2220. For example, in some embodiments, tracking module 2222 samples (for use by the navigation module 2218) a GNSS satellite signal using a tracking frequency and code shift determined by the acquisition module 2220.

Dual-stage tracking system 2207 complements tracking module 2222 by performing certain GNSS satellite signal tracking operations in hardware, as described in greater detail below. Optionally, mobile object system 2200 includes an acquisition hardware module (e.g., implemented as one of the CPUs) that works in conjunction with acquisition module 2220 for acquiring (determining range or pseudorange, carrier phase, etc.) multiple satellite navigation signals distinct from dual-stage tracking system 2207. In some embodiments, as each satellite navigation signal is acquired (e.g., by acquisition module 2220, with or without accelerated acquisition by an acquisition hardware module), a corresponding channel or channel tracking loop of the dual-stage tracking system 2207 is initialized with carrier phase information, after which the channel tracking loop maintains lock or synchronization with the received satellite navigation signal so long as the satellite transmitting that satellite navigation signal remains in view of the mobile object system 2200.

Operating system 2212 and each of the above identified modules and applications correspond to a set of instructions for performing a function described above. The set of instructions can be executed by the one or more processors 2202 of mobile object system 2200. The above identified modules, applications or programs (i.e., sets of instructions) need not be implemented as separate software programs, procedures or modules, and thus various subsets of these modules may be combined or otherwise re-arranged in various embodiments. In some embodiments, memory 2210 stores a subset of the modules and data structures identified above. Furthermore, memory 2210 optionally stores additional modules and data structures not described above.

FIG. 2 is intended more as a functional description of the various features which may be present in a mobile object system 2200 of a mobile object 1110 than as a structural schematic of the embodiments described herein. In practice, and as recognized by those of ordinary skill in the art, items shown separately could be combined and some items could be separated. For example, some items shown separately in FIG. 2 could be combined into a single module or component, and single items could be implemented using two or more modules or components. The actual number of modules and components, and how features are allocated among them will vary from one implementation to another.

In addition, in some embodiments, some or all of the above-described functions may be implemented with hardware circuits (e.g., which may comprise graphics processors for efficiently performing discrete Fourier transforms (DFTs), field programmable gate arrays (FPGAs), application specific integrated circuits (ASICs), a "system on a chip" that includes processors and memory, or the like). To that end, in some embodiments, CPUs 2202 include specialized hardware for performing these and other tasks. In some embodiments, these operations are performed by satellite receiver 1150.

Figure 3:
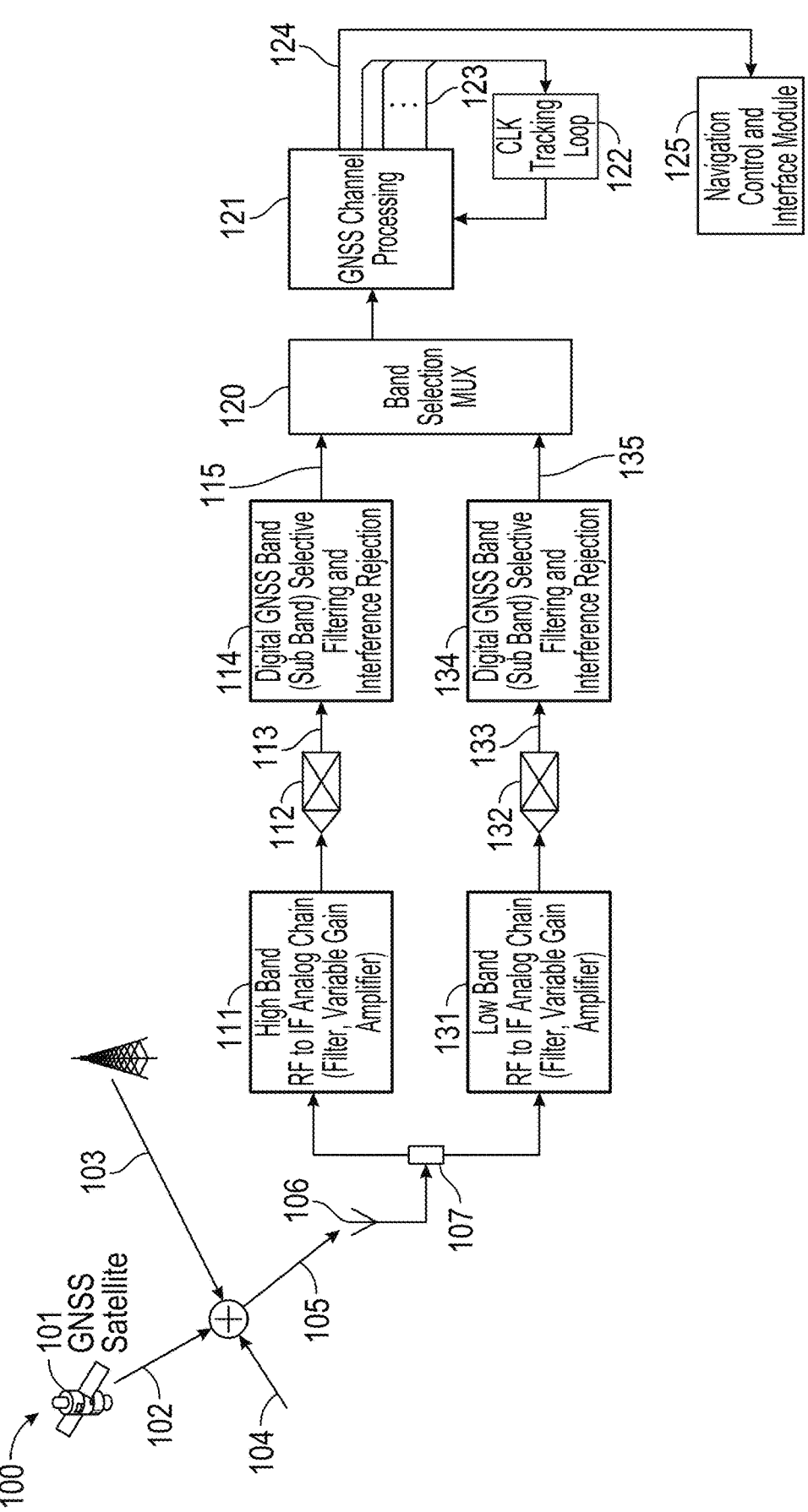
FIG. 3 is a block diagram illustrating a system architecture for a GNSS receiver, in accordance with some embodiments.

FIG. 3 is a block diagram illustrating a system architecture 100 for a GNSS receiver, in accordance with some embodiments. The system architecture 100 represents a typical reception environment for a global navigation satellite system (GNSS) receiver. A satellite 101 transmits a GNSS signal 102 (sometimes called a satellite signal or satellite navigation signal) on multiple frequencies (e.g., 2 or 3 frequencies). The GNSS signal 102 is attenuated or disturbed by free space propagation, the ionosphere and troposphere. The GNSS signal 102, as well as other signals from the same or different satellites, is received by antenna 106. At locations close to the antenna 106, the GNSS signal 102 is further corrupted by background noise 104 and potentially an interference signal 103, such as from land tower radio transmissions in the same frequency band as the GNSS signal 102. The interference signal 103 can be classified as either wideband interference (WBI, e.g., comprising pulse-like signals) or narrowband interference (NBI, e.g., continuous wave (CW) signals whose bandwidth is relatively narrow compared with the satellite signal). The sum of the GNSS signal 102, background noise 104 and interference signal 103 is composite signal 105.

The composite signal 105 is received by antenna 106, which typically has a built-in low noise amplifier (LNA). To simplify the receiver analog filtering design, a typical modern GNSS receiver uses a wideband front-end design to receive multiple GNSS signals (e.g., from multiple satellites and/or multiple frequency bands) using, e.g., two or three wideband filters, each band targeting a bandwidth of 140-300 MHz. For example, in a dual band system, a diplex 107 splits the composite signal into an upper path and lower path. The upper filtering module 111 contains a mixer which moves received signals in the high band (L1, G1, B1 etc.) radio frequency (RF) into an intermediate frequency (IF) band. The upper filtering module 111 also includes a bandpass filter (BPF) that rejects the image band of the mixer output. Typically, the bandpass filter or a subsequent filter of the upper filtering module 111 includes multiple stages of IF filtering and a variable gain amplifier (VGA) to adapt the signal amplitude (e.g., signal voltage, peak to peak) within the operating range of an analog-to-digital converter (ADC) 112 that receives the output of the upper filtering module. The ADC 112 samples the analog signal using a predefined sampling rate, which, per the Nyquist theorem, is greater than the bandwidth for complex sampling and twice the bandwidth for the real sampling design. The width of the ADC determines maximum tolerable interference at a given quantization loss. The resulting digital signal 113, sometimes called a digital sequence, produced by the ADC 112 reconstructs the received high band RF spectrum in the baseband range.

VGA feedback control can be handled in either the analog or digital domain. An envelope detector is typically used for VGA if analog control is used. In some embodiments, digital signal 113 is used as a feedback signal to control VGAs in upper filtering module 111.

A digital filtering and interference rejection module 114 extracts the targeted component (e.g., the signal in a particular frequency band, such as L1, L2 or L5) from the whole high band spectrum of signals included in the digital signal 113. However, interference (e.g., background noise 104 and interference signal 103) located within the GNSS band cannot be removed by the single stage filtering provided by upper filtering module 111, and therefore interference rejection processing is included in the digital filtering and interference rejection module 114 as well. Based on the complexity and the technique being adopted, the digital filtering and interference rejection module 114 can reject a single or multiple narrow band interference (NBI) and/or some types of wideband interference (WBI). A resulting signal 115 is expected to comprise only the satellite signal, including a pseudorandom noise (PN) sequence mixed with an underlying data signal, and the background noise 104.

Equivalently to its counterpart along the upper path, the lower path from diplex 107 is processed by analog filtering and variable amplifier module 131 and ADC 132. The resulting digital signal 133 represents the low band RF spectrum at baseband range. A digital filtering and interference rejection module 134 extracts the targeted component (e.g., the signal in a particular frequency band, such as L1, L2 or L5) from the whole low band spectrum of signals included in the digital signal 133. A resulting signal 135 is expected to comprise only the satellite signal, including a pseudorandom noise (PN) sequence mixed with an underlying data signal, and the background noise 104.

Each channel, typically implemented using separate hardware or circuitry from the other channels, includes a band selection multiplexor (MUX) 120 which selects the sample stream from a band that carries the targeted PN sequence, e.g., the channel selects the L1 band (e.g., a band that includes 1575.42 MHz for GPS L1) if the targeted PN sequence type is GPS L1 CA. The appropriate sample stream is further processed by the GNSS channel module 121, which typically contains one or multiple carrier phase demodulators, the PN code generator sampled at multiple delayed phases, the binary offset sub-carrier (BOC) modulator (used for modern GNSS signal such as GPS L1C, BeiDou B1C, Galileo E1 signals, etc.), and multiple accumulators, to create a bank of in-phase (I) and quadrature (Q) measurements at an interval of one millisecond (ms) or multiple milliseconds to drive the baseband tracking loop. Carrier and code correction signals derived from the baseband tracking loops control numerically controlled oscillators (NCOs) in the GNSS channel module 121 to maintain synchronization between the received signal in the channel and the local replica signal in that channel. Clock correction signals 123 from a plurality of the channels are used by clock tracking loop 122 to correct for receiver clock errors.

In order to mitigate the tracking degradation results from clock micro jumps (also called clock resets, or clock jumps), a set of IQ measurements 225-235 (see FIG. 4) from multiple channels are used (e.g., by clock tracking loop 230) to extract the common carrier misalignment (the clock error). Because the common clock error is obtained by averaging over multiple channels (e.g., averaging over the channels for the satellite signals active being received—from satellites in view of the mobile object system), the signal to noise ratio (SNR) is improved by the number of channels; as a result, the clock tracking loop can use a wider loop bandwidth (for example a channel loop bandwidth of 75 Hz to 120 Hz) compared with the 20 Hz channel loop bandwidth of a typical GNSS receiver's clock tracking loop; the clock tracking loop 230 can also iterate at a faster rate. Both the wider loop bandwidth and the faster iteration can speed up the loop response to a relatively large micro jump (for example 15-25 Hz) and significantly reduce the probability of cycle slips. Carrier tracking, however, is based on a single satellite signal and thus does not benefit from the increased bandwidth. Thus, in some embodiments, the estimate of the clock error is generated at a first rate and the estimate of the carrier tracking error for each of the channels is generated at a second rate that is slower than the first rate.

The navigation module 125 takes the pseudo-range and carrier phase measurements 124 and other related information from the satellites to generate the positioning solution, which is used as a feedback to align the receiver crystal-grade clock with the satellite-based atomic grade clock. These pseudo-range and carrier phase measurements are, directly or indirectly, based on various corrections made to various errors, including corrections to the receiver clock error and the carrier tracking error. Thus, the navigation module 125 computes position and velocity estimates for the mobile object in accordance with the estimate of the clock error and the estimate of the respective carrier tracking error for each of the plurality of channels, as described below. In some embodiments, the computed position of the mobile object, combined with other information, is used by navigation module 125 to generate a list of in-view satellites (e.g., based on information programmed into navigation module 125 concerning the orbits of the satellites in all the satellite constellations tracked by the mobile object system 2200, which is used in turn to control the allocation of receiver resources. In some embodiments, the navigation module 125 performs a navigation function for the mobile object (e.g., routing of the mobile object) in accordance with the computed position and velocity estimates for the mobile object.

Figure 4:
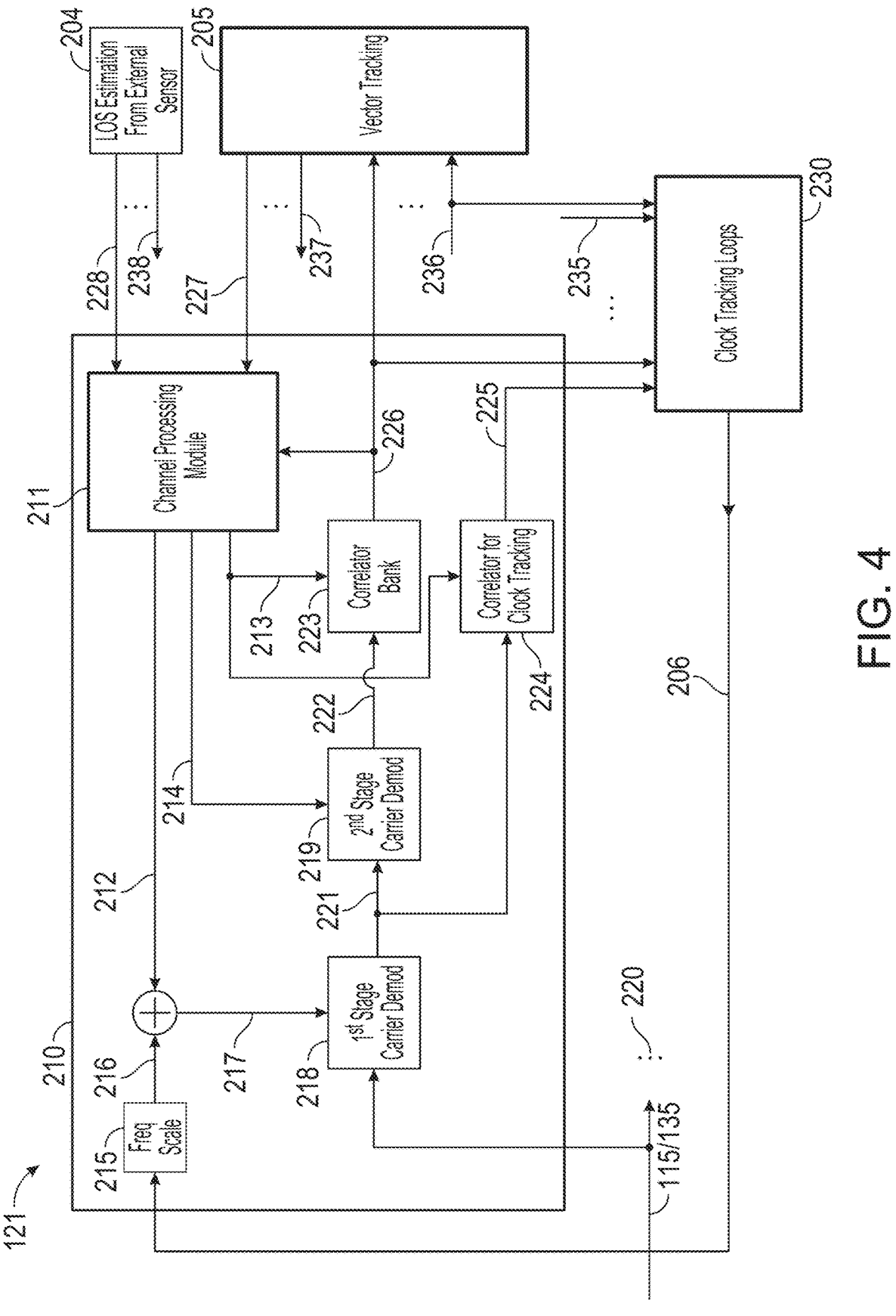
FIG. 4 is a block diagram of a dual-stage carrier tracking system, in accordance with some embodiments.

FIG. 4 is a block diagram of a GNSS channel module 121, operating in baseband, with a dual-stage carrier tracking system, in accordance with some embodiments. In FIG. 4, subsystem 210 processes the signal 115/135 of a specific GNSS band (e.g., subsystem 210 is for a specific channel, which includes a corresponding channel tracking loop, and each channel has an equivalent to subsystem 210). Stated another way subsystem 210 corresponds to one channel, or channel tracking loop, for maintaining synchronization with one satellite signal, and GNSS channel module 121 includes multiple instances of subsystem 210, one for each distinct channel and corresponding satellite signal. In some embodiments, the number of channels in GNSS channel module 121 is greater than 20, 30, 50 or 100. Each channel of the plurality of channels in GNSS channel module 121 processes a corresponding satellite navigation signal of the received satellite navigation signals and includes a corresponding channel tracking loop. Ellipses 220 indicate that the signals 115/135 are provided to instances of subsystem 210 for multiple channels, each with analogous processing to that described with respect to FIG. 4. Thus, FIG. 4 illustrates a respective channel tracking loop of a plurality of channel tracking loops. As discussed below, each channel tracking loop of the plurality of channel tracking loops corresponds to a respective channel of a plurality of channels and has a first error correction stage (e.g., which includes first stage demodulator 218 and correlator 224) and a second error correction stage (e.g., which includes second stage demodulator 219 and correlator bank 223). The first error correction stage is decoupled from an output of the second error correction stage (e.g., second stage demodulator 219). Each channel tracking loop is configured to, using one or more of the satellite navigation signals from the plurality of satellites (e.g., a satellite navigation signal from a single, corresponding satellite), generate an estimate of clock error of a clock of the mobile object using a first error correction stage; and generate an estimate of a respective carrier tracking error for the respective channel using a second error correction stage that is distinct from the first error correction stage. The correlator 224 (e.g., a first accumulator) produces a first accumulation signal (e.g., IQ accumulation signal 225) that is fed to clock tracking loop 230. In some embodiments, as described below, the clock tracking loop 230 removes a sign ambiguity resulting from data embedded in the GNSS signal. The correlator bank 223 (e.g., second accumulator) produces a second accumulation signal (e.g., IQ accumulation signal 226) that is used to generate the local code signal 213 and local carrier signals 212 and 214, which, together with estimated clock drift signal 206, are used to demodulate the received signal 115 and 135. In some embodiments, the channel tracking loops are augmented by one or a plurality of external sensor signals. In some embodiments, channel tracking loops with respect to weak signals, e.g., estimated LOS signal 227, benefit from the channel tracking loops with respect to strong signals through the vector tracking module 205.

To that end, each channel (i.e., each instance of subsystem 210) includes a GNSS channel processing module 211, a first stage demodulator 218, a second stage demodulator 219, a correlator bank 223 for carrier tracking (in baseband), and the correlator 224 for clock tracking. In some embodiments, a subsystem 204 that includes an external sensor 204 (e.g., an inertial measurement unit) generates a measured line-of-sight (LOS) signal for each channel (e.g., measured LOS signal 228 corresponding to the channel processed by subsystem 210; measured LOS signal 238 corresponding to a different channel). In some embodiments, vector tracking module 205 generates an estimated LOS signal for each channel (e.g., estimated LOS signal 227 corresponding to the channel processed by subsystem 210; estimated LOS signal 237 corresponding to a different channel). The GNSS channel processing module 211 combines the line-of-sight (LOS) signal, from either subsystem 204 or vector tracking module 205 or both, and properly scales it to the LOS carrier signal 212 (e.g., the GNSS channel processing module 211 generates an estimate of a line of sight Doppler error for the respective channel using the first error correction stage, wherein the estimate of the clock error is based at least in part on the line of sight Doppler error for the respective channel). The GNSS channel processing module 211 also comprises a carrier tracking loop and a code tracking loop. The carrier tracking loop generates a local residual carrier signal 214, while the code tracking loop generates multiple pseudo-random noise (PN) sequences (see 312-314, FIG. 5) that have different phase offsets with respect to the signal 115/135.

A frequency scaling unit 215 scales a clock carrier signal 206 measured at a reference standard to the frequency of the GNSS signal standard (e.g., for the selected GNSS signal) to produce a clock carrier signal 216. Clock carrier signal 216 is combined with the LOS carrier signal 212 to create a first local carrier signal 217, which is used by the first stage demodulator 218 to remove the LOS and clock carrier components of the received signal 115/135 to produce output signal 221. The second stage demodulator 219 combines the output signal 221 with the local residual carrier signal 214 to translate an output signal 222 of the second stage demodulator to "zero" carrier frequency.

The output signal 222 from the second stage carrier demodulator is used by correlator bank 223 to generate IQ accumulation signal 226 to drive the carrier loop and code loop in the GNSS channel processing module 211, and the vector tracking module 205.

The output signal 221 from the first stage carrier demodulator, combined with the IQ measurements 213, is used by the correlator 224 to create an IQ accumulation signal 225 for clock tracking loop 230.

In some embodiments, clock tracking loop 230 is driven by the IQ accumulation signal from each channel. In the example of FIG. 4, both the IQ accumulation signal 225 of subsystem 210 and the IQ accumulation signal 235 of a different subsystem (analogous to subsystem 210) are derived from the output of the first stage carrier demodulator of those subsystems. Similarly, both IQ accumulation signal 226 of the subsystem 210 and the IQ accumulation signal 236 of the different subsystem are derived from the output of the second stage carrier demodulator of those subsystems.

The vector tracking module 205 takes the IQ accumulation signals 226-236 from the second stage carrier demodulator of multiple active channels, combines them with a carrier projection function based on the positioning solution (e.g., the current position of the mobile object as determined by the mobile object's navigation module), and creates a LOS carrier estimation for each active channel (e.g., estimated LOS signal 227 for a first channel, estimated LOS signal 237 for a second channel), where the active channels are the ones for which satellite signals are currently being received and processed by the mobile object system. In some embodiments, both the IQ accumulation signal 226 of the subsystem 210 and the IQ accumulation signal 236 of the second channel subsystem are based on outputs from the second stage carrier demodulator 219 of the corresponding subsystems 210.

In some embodiments, one or more of the components shown in FIG. 4 are integrated on and executed by an application-specific integrated circuit (ASIC). In some embodiments, the plurality of channel tracking loops are integrated on and executed by an application-specific integrated circuit (ASIC). In some embodiments, all of the components shown in FIG. 4, other than GNSS channel processing module 211, are integrated on and executed by an application-specific integrated circuit (ASIC).

Figure 5:
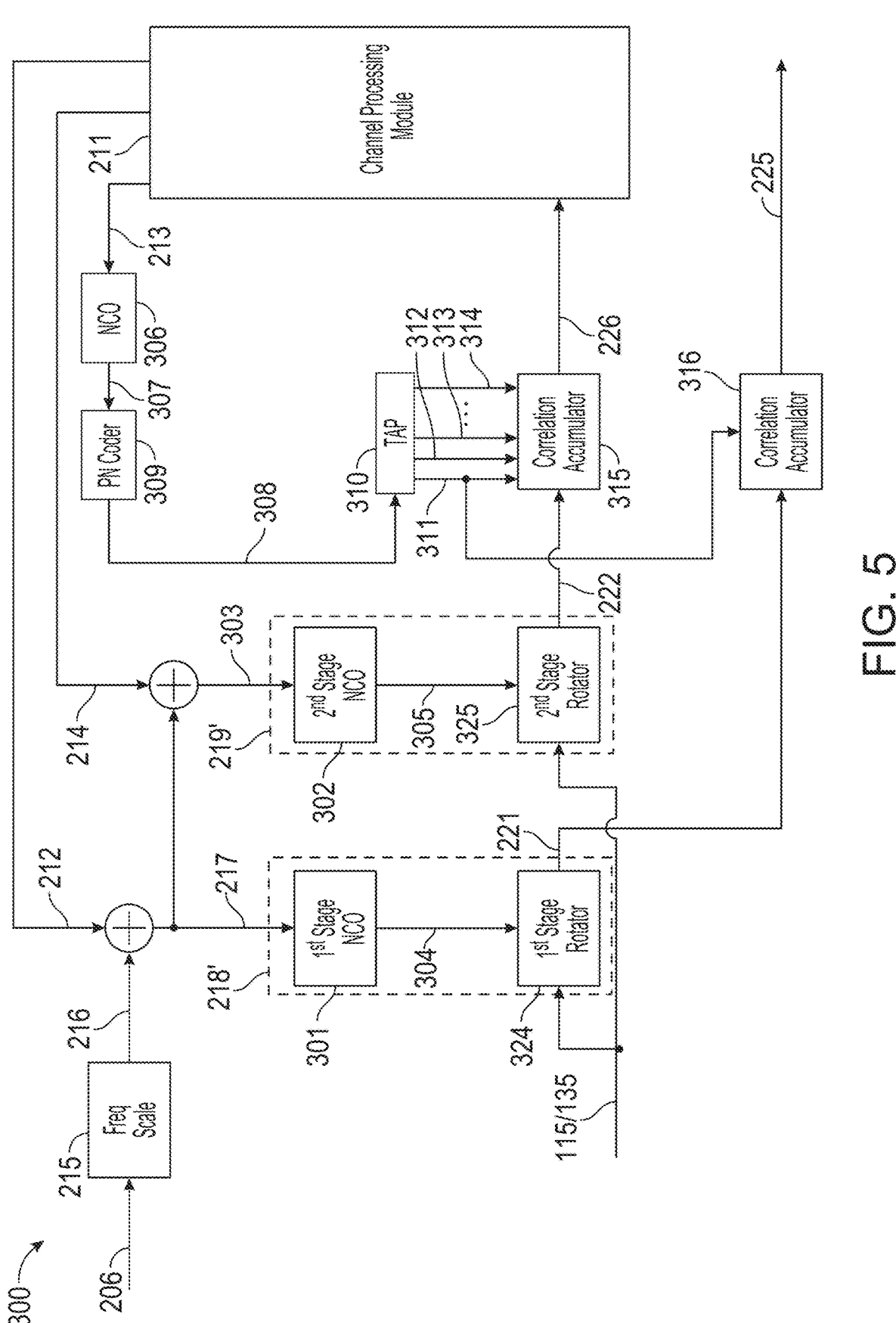
FIG. 5 is a block diagram of a dual-stage carrier tracking system with dual stage carrier demodulation, in accordance with some embodiments.

FIG. 5 is a block diagram of a dual-stage carrier tracking system 300 with dual stage carrier demodulation, in accordance with some embodiments. In particular, FIG. 5 illustrates a system 300, which is an alternative to subsystem 210 (shown in FIG. 4), that has a parallel processing structure for the second carrier demodulator as compared to the cascaded structure of subsystem 210 illustrated in FIG. 4. A first stage carrier demodulator 218' comprises a first numerically controlled oscillator (NCO) 301 and a first complex de-rotator 324. It is noted that the term "rotator" and "de-rotator" are used synonymously herein. The signal 304 output by the first NCO 301 drives a sine and cosine lookup table (LUT) in the first complex de-rotator 324 to generate a first local complex rotation vector. The first local complex rotation vector is used to demodulate the LOS and clock carrier component of the signal 115/135.

A second stage carrier demodulator 219' in FIG. 5 uses a parallel structure that, although functionally equivalent to the cascaded structure FIG. 4, may, in some circumstances, improve precision. In FIG. 4, the second stage carrier demodulator 219 uses the output signal 221 from the first stage demodulator 218 and combines that with the local residual carrier signal 214 to generate the output signal 222. In some embodiments, as shown in FIG. 5, the second stage carrier demodulator 219' combines the signal 115/135 with an aggregated local carrier signal 303 to produce the output signal 222. The local carrier signal 303, which is a combination of first local carrier signal 217 and the local residual carrier signal 214, is much larger than the local residual carrier signal 214 alone, so that it traverses the sine and cosine lookup table (LUT) in the second stage de-rotator 325 much faster than if only the local residual carrier signal 214 (as in the GNSS channel module 121 of FIG. 4) were being used to drive the second stage NCO 302, and thereby avoids a numerical precision issue associated with slower traversal of the lookup table as in the GNSS channel module 121 of FIG. 4. By traversing the lookup table in the second stage carrier demodulator 219' faster, the individual entries in the lookup table need less precision in order to provide a sinusoidal output, or, equivalently, provide an output that more closely tracks a sinusoid than if the lookup table were traversed using an input signal that varies more slowly.

In FIG. 5, the second stage carrier demodulator 219' includes a second stage NCO 302 (distinct from the first stage NCO 301) and a second complex de-rotator 325; and a local carrier signal 303, which is a combination of the first local carrier signal 217 (LOS and clock carrier frequency) with the local residual carrier signal 214, drives the second stage NCO 302. The signal 305 produced by the second stage NCO 302 drives the sine and cosine lookup table in the second complex de-rotator 325 to generate the output signal 222 (e.g., a local complex rotation vector) by demodulating the line-of-site signal, clock and residual carrier frequency in the signal 115/135.

A code NCO 306 is driven by the signal 213, produced by a code tracking loop in the GNSS channel module 121, to generate the chip enable signal 307 which drives a PN coder 309 to move the state of a linear feedback shift register (LFSR) in the PN coder 309 from a kth epoch to the (k+1)th epoch, or more generally from one epoch to a next epoch. The signal 308 represents the latest chip of a respective PN code generated by the PN coder 309 and passes through a delay unit 310 to produce multiple local PN sequences, each with a different delay with respect to the PN phase embedded in the output signal 221 from the first stage de-rotator 324 and output signal 222 from the second stage de-rotator 326. In some embodiments, local PN replica 311 (a first one of the local PN sequences) is assumed to have zero delay with respect to the PN phase of output signals 221 and 222. Local PN replicas 312, 313, and 314 are PN sequences with different phase offsets with respect to the PN phase of the output signals 221 and 222. The correlation accumulator 315 demodulates the PN sequence of the output signal 222 using multiple local PN replicas 311 through 314 and uses the results to creates IQ accumulation signal 226, which it provides to the GNSS channel processing (e.g., baseband tracking) module 211.

The correlation accumulator unit 316 combines the output signals 221 from the first demodulator (first stage de-rotator 324) and the local PN replica 311 to produce the IQ accumulation signal 225. The IQ accumulation signal 225 and the IQ accumulation signal 226 create a bundled signal for the channel corresponding to subsystem 210 that is fed into the clock tracking loop 230. Multiple bundled signals from other channels are also used by the clock tracking loop 230 to track the clock frequency.

Thus, in the parallel configuration, the first error correction stage (which includes NCO 301, first complex de-rotator 324, and correlation accumulator unit 316) is decoupled from an output of the second error correction stage (which includes NCO 302, second complex de-rotator 325, and correlation accumulator unit 315). In addition, the second error correction stage is decoupled from an output of the first error correction stage. More specifically, the correlation accumulator 315 is independent of an output of correlation accumulator 316, and vice versa. The correlation accumulator 316 (e.g., a first accumulator) produces a first accumulation signal (e.g., IQ accumulation signal 225) that is fed to clock tracking loop 230. In some embodiments, as described below, the clock tracking loop 230 removes a sign ambiguity resulting from data embedded in the received GNSS signal. The correlation accumulator 315 (e.g., second accumulator) produces a second accumulation signal (e.g., IQ accumulation signal 226) that is fed back to a channel tracking loop (included in GNSS channel processing module 211) of the respective channel, which includes a code tracking loop to generate the local code rate signal 213 and a carrier tracking loop to generate the local carrier rate signal 214. In some embodiments, the carrier tracking loop of the channel tracking loop in GNSS channel processing module 211 is a phase-locked loop.

In some embodiments, one or more of the components shown in FIG. 5 are integrated on and executed by an application-specific integrated circuit (ASIC). In some embodiments, the plurality of channel tracking loops are integrated on and executed by an application-specific integrated circuit (ASIC).

Figure 6:
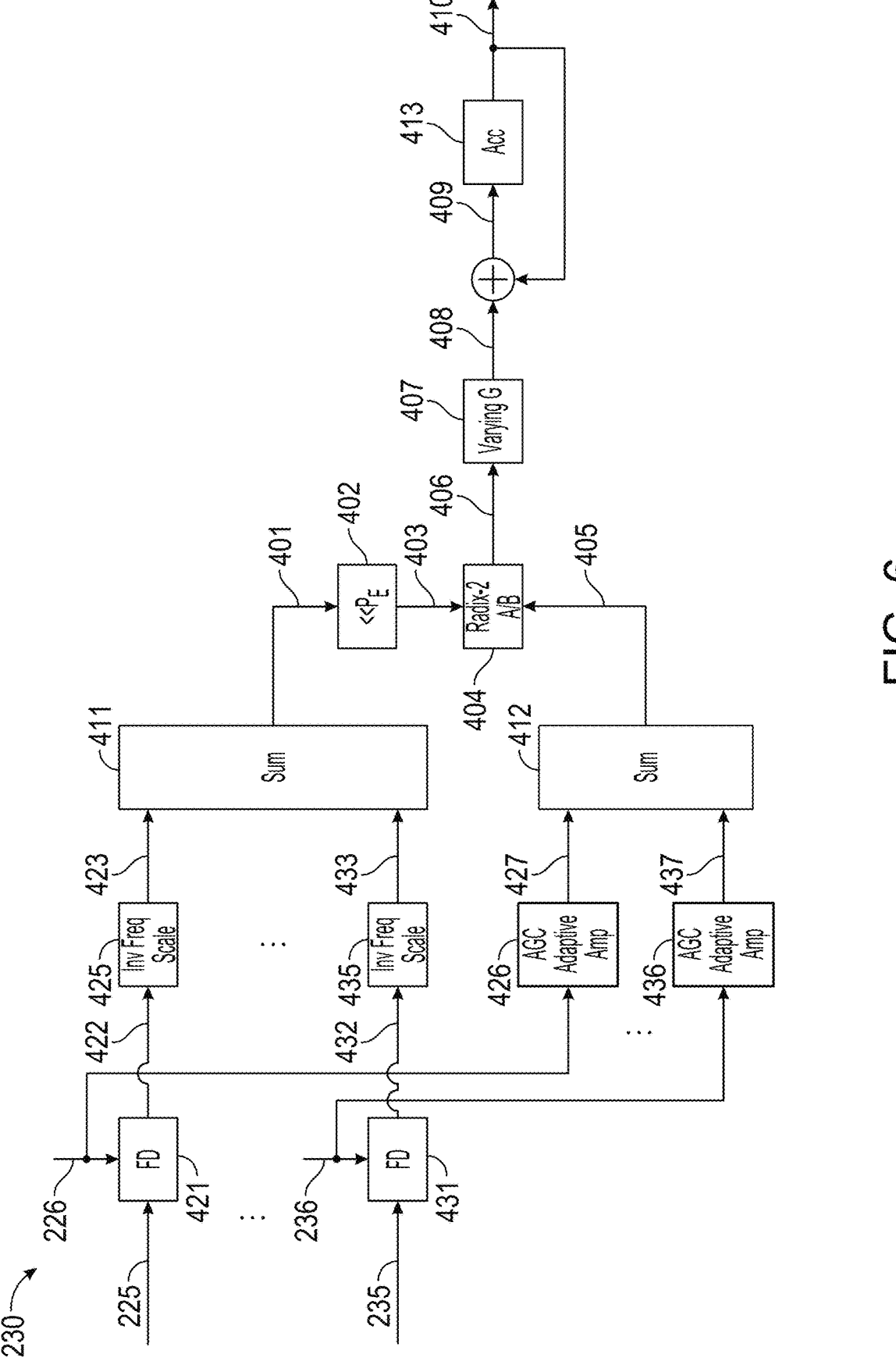
FIG. 6 is a block diagram of a clock tracking loop, in accordance with some embodiments.

FIG. 6 is a block diagram of a clock tracking loop 230, in accordance with some embodiments. A first frequency detector 421 uses the bundled signals 225 and 226 (e.g., from subsystem 210, FIG. 4, or system 300, FIG. 5) to produce the first carrier frequency error 422 representing misalignment between the signal 115 and the combined LOS and clock carrier frequency for a first satellite. The resulting first carrier frequency error 422 is at the GNSS signal standard (e.g., for the GNSS signal type), which is scaled to the signal 423 at the reference frequency standard (e.g., an arbitrary frequency chosen by the receiver designer) by the first inverse frequency scaling unit 425.

A second frequency detector 431 uses the bundled IQ accumulation signals 235 and 236 (from the second channel subsystem) to produce the second carrier frequency offset 432 between the signal 115 and the combined local LOS and clock carrier frequency for a second channel (e.g., for a second satellite or a second satellite signal transmitted by the same satellite as the satellite signal processed by the first frequency detector 421). The resulting carrier frequency error 432 is at the GNSS signal standard, which is scaled to the signal 433 at the reference frequency standard by the second inverse frequency scaling unit 435.

A first amplitude calculation unit 426 uses the IQ accumulation signal 226 (from the subsystem 210) to generate a first amplitude signal 427. The first amplitude unit calculation unit 426 can adaptively offset the amplitude oscillation resulting from automatic gain control (AGC) fluctuation. Similarly, a second amplitude calculation unit 436 uses the IQ accumulation signal 236 (from the second channel) to generate a second amplitude signal 437.

A summing unit 411 combines the un-normalized frequency errors from multiple active channels to create the sum of the frequency error signal 401. Each frequency error signal, such as the signal 423, comprises the frequency error of the clock and the LOS Doppler shift frequency error. In accordance with the geometric layout of typical constellations of satellites used for navigation, the number of satellites moving toward the receiver, at any epoch, should be approximately balanced with the number of the satellites moving away from the receiver. Thus, the average and sum of the LOS frequency error results is typically small. Therefore, the clock tracking error, which is common to all channel subsystems, is reinforced by the summing unit 411. As a result, the frequency error signal 401, shown in Equation 1, represents the clock frequency error mixed with a small fluctuation.

$$ERR_{401} = \sum_{k=1}^{N} F_k^{-1} A_k \sin\left(\varphi_k^{LOS} + \varphi_k^{CLK} + \theta_k^{Res}\right) \approx \qquad \text{Equation 1}$$
$$\sum_{k=1}^{N} F_k^{-1} A_k\left(\varphi_k^{LOS} + \theta_k^{Res}\right) + \varphi^{CLK} \sum_{k=1}^{N} A_k,$$

where.
  $ERR_{401}$ denotes the combined frequency error 401, $$F_k^{-1}$$

represents the inverse frequency scaling unit for $k^{th}$ channel, which converts the frequency error measured at the $k^{th}$ GNSS signal standard to the error measured at the reference standard, $$A_k \sin\left(\varphi_k^{LOS} + \varphi^{CLK} + \theta_k^{Res}\right)$$

denotes the output from the $k^{th}$ frequency detector,
  $A_k$ is the amplitude of the IQs of the $k^{th}$ channel, $$\varphi_k^{LOS}$$

is the LOS carrier error of the $k^{th}$ channel, also known as the LOS Doppler shift error for the $k^{th}$ channel, $$\theta_k^{Res}$$

is the residual carrier error of the $k^{th}$ channel, and $$\varphi_k^{CLK}$$

is the clock frequency error measured at the $k^{th}$ GNSS signal standard, $$\varphi^{CLK}$$

is the common clock frequency error measured at reference frequency standard, equal to $$F_k^{-1} \varphi_k^{CLK}$$

Assuming the tracking is tightly closed, the approximation $\sin(x) \approx x$ removes the sine function and produces a linear approximation of the frequency error measurement.

The frequency error 401 is scaled by a predefined precision unit 402, and the resulting frequency error signal 403 becomes:

$$ERR_{403} \approx 2^E \sum\nolimits_{k=1}^{N} F_k^{-1} A_k \left( \varphi_k^{LOS} + \theta_k^{Res} \right) + 2^E \varphi^{CLK} \sum\nolimits_{k=1}^{N} A_k \qquad \text{Equation 2}$$

A summing unit 412 combines (e.g., sums) the amplitude of IQs from multiple active channels to create a normalization signal 405 which is modelled as:

$$NORM_{405} = \sum\nolimits_{k=1}^{N} A_k \qquad \text{Equation 3}$$

In order to obtain the normalized frequency error, a divider 404 is used to remove the amplitude modulation from the frequency error signal 403, resulting in a normalized clock frequency error 406 given by Equation 4:

$$NORM\_ERR_{406} = ERR_{403}/NORM_{405} = \qquad \text{Equation 4}$$

$$2^E \left\{ \sum\nolimits_{k=1}^{N} F_k^{-1} A_k \left( \varphi_k^{LOS} + \theta_k^{Res} \right) + \varphi^{CLK} \sum\nolimits_{k=1}^{N} A_k \right\} / \sum\nolimits_{k=1}^{N} A_k =$$

$$2^E \varphi^{CLK} + 2^E \left\{ \sum\nolimits_{k=1}^{N} A_k F_k^{-1} \left( \varphi_k^{LOS} + \theta_k^{Res} \right) \right\} / \sum\nolimits_{k=1}^{N} A_k$$

where
NORM_ERR$_{406}$ denotes the normalized clock frequency measured at reference standard, $$F_k^{-1} \left( \varphi_k^{LOS} + \theta_k^{Res} \right)$$

denotes the LOS frequency error and residual frequency measured at reference standard, and $$\sum\nolimits_{k=1}^{N} A_k F_k^{-1} \left( \varphi_k^{LOS} + \theta_k^{Res} \right)$$

is the sum of LOS frequency error and residual frequency, weighted by the amplitude, $A_k$, of the IQs of each channel $$\sum\nolimits_{k=1}^{N} A_k$$

is the sum of weights (i.e., the sum of the amplitudes of the IQs of the channels denoted by k=1 to N).

As discussed in section above, the weighted average LOS frequency error and residual carrier frequency error is typically small, and thus:

$$2^E \left\{ \sum\nolimits_{k=1}^{N} A_k F_k^{-1} \left( \varphi_k^{LOS} + \theta_k^{Res} \right) \right\} / \sum\nolimits_{k=1}^{N} A_k \approx 0 \qquad \text{Equation 5}$$

In some embodiments, the clock tracking loop 230 uses a first order automatic frequency control (AFC) which comprises a gain selection unit 407 and a frequency accumulator 413. The normalized clock frequency error 406 passes through the gain selection unit 407, where a higher gain implies use of a wider loop bandwidth. The frequency error is scaled by the selected gain at gain selection unit 407 to create a frequency correction signal 408 sampled at a next epoch (e.g., a second epoch). The frequency correction signal 408, as sampled at the next epoch, is combined with the clock frequency 410 sampled at the current epoch (e.g., a first epoch immediate prior to the second epoch) to produce the latest clock frequency 409 sampled at the next epoch.

Figure 7:
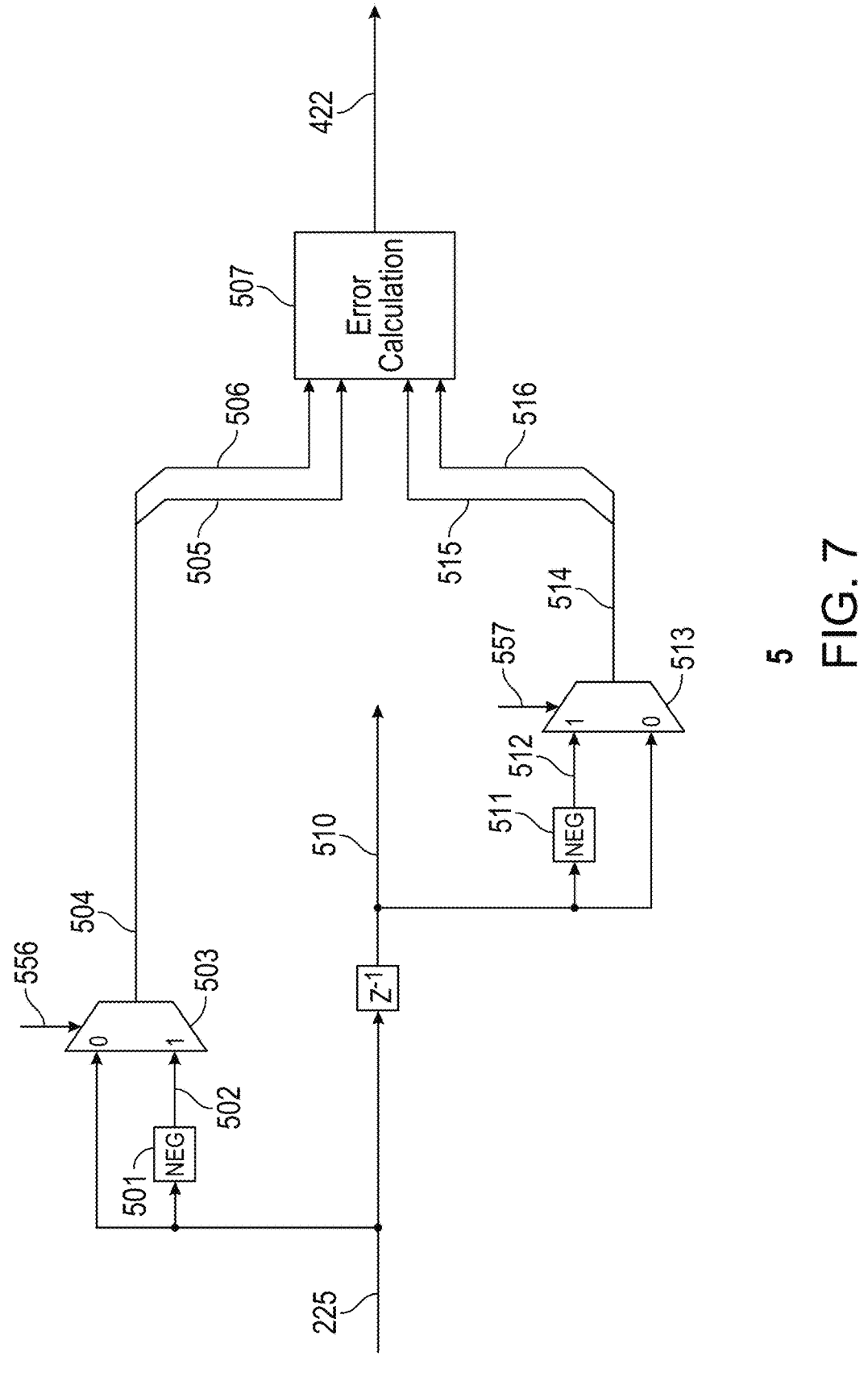
FIG. 7 is a block diagram of a frequency error detection system (e.g., circuitry), in accordance with some embodiments.

FIG. 7 is a block diagram of a frequency error detection system 421, in accordance with some embodiments. In particular, FIG. 7 illustrates the first frequency detector 421 (see FIG. 6). A negate unit 501 inverts the sign of the IQ accumulation signal 225 to create a negative signal 502. A first multiplexer (MUX) 503, using a first sign selection signal 556, selects the IQ with proper sign (225 or 502) to create complex signal 504. The complex signal 504 is split into two components: an I component 505 and a Q component 506.

The IQ accumulation signal 225 is delayed by one clock cycle and results in a signal 510. The signal 510 is inverted by a negate unit 511 to obtain its negative version 512. A second multiplexer (MUX) 513, using the second sign selection signal 557, selects the IQ with proper sign (510 or 512) to create complex signal 514. The complex signal 514 is split into two components: an I component 515 and a Q component 516.

I components 505, Q component 506, I component 515, and Q component 516 are combined by the frequency error calculation unit 507 to generate a first carrier frequency error signal 422, according to Equation 6.

$$ERR_{422} = |I_{505} - Q_{516}| - \qquad \text{Equation 6}$$

$$|I_{505} + Q_{516}| - |I_{515} - Q_{506}| + |I_{515} + Q_{506}|$$

Equation 6 is a linear approximation to simplify the ASIC design and reduce noise.

Figure 8:
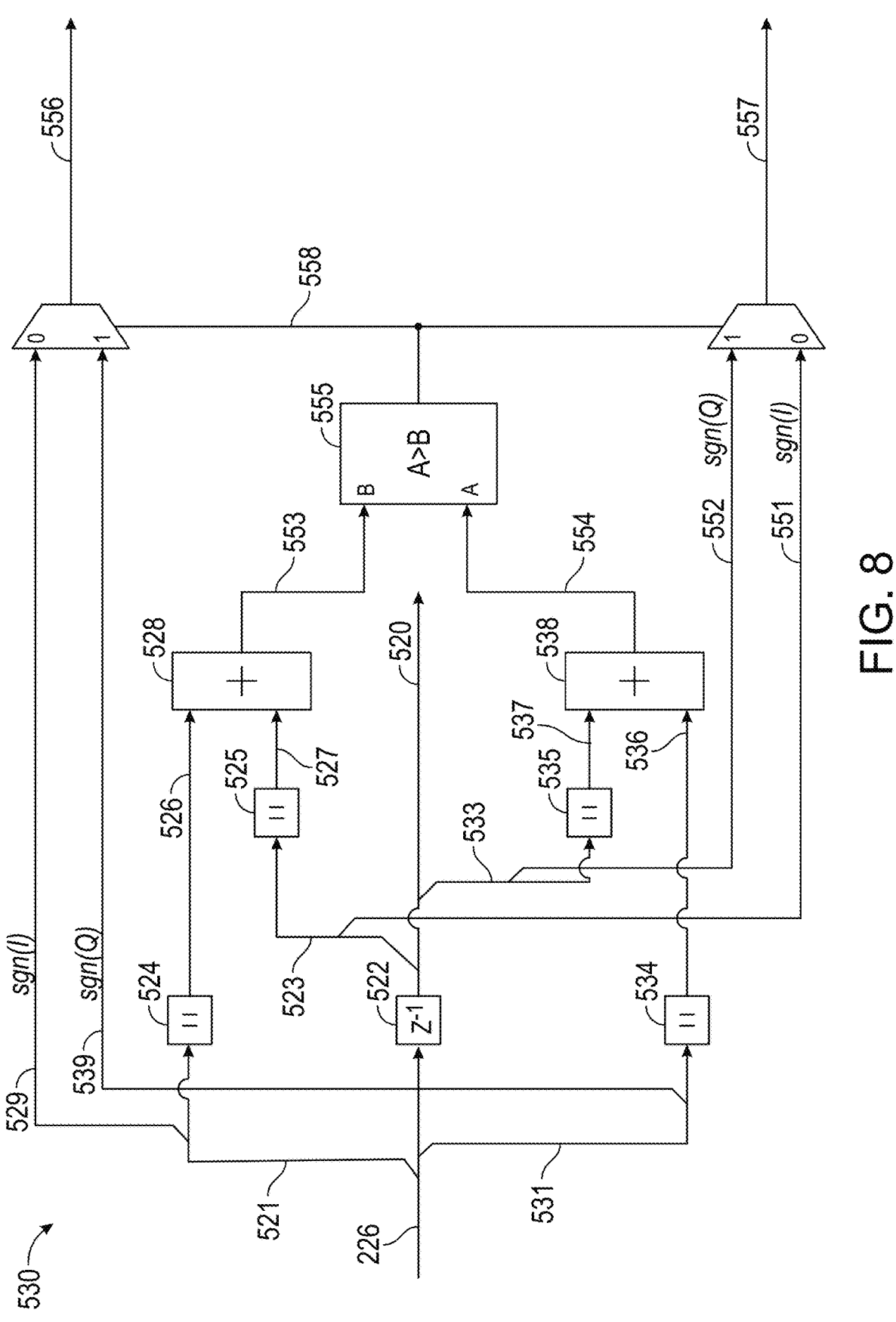
FIG. 8 is a block diagram of an IQ sign demodulation system, in accordance with some embodiments.

FIG. 8 is a block diagram of an IQ sign demodulation system 530, in accordance with some embodiments. In particular, FIG. 8 illustrates data demodulation on IQs to improve the accuracy of first frequency detector 421 and/or second frequency detector 431. IQ sign demodulation system 530 produces the first sign selection signal 556 for the first MUX 503 and the second sign selection signal 557 for the second MUX 513.

FIG. 8 illustrates I component 521 and Q component 531 of IQ accumulation signal 226 at a first epoch, as well as sign signal of I component 529 and sign of the Q component 539 of IQ accumulation signal 226 at the first epoch.

The signal 520 is the complex signal at the second epoch, which is one clock cycle delayed relative to the IQ accumulation signal 226. Similarly, the signal 523 is the I component of the signal 520 and the signal 533 is the Q component. The signal 551 is the sign of the I component 522 of signal 520, and the signal 552 is the sign of the Q component 533 of signal 520. The first sign selection signal 556 for the first epoch and the second sign selection signal 557 for the second epoch are determined by a selection signal 558, resulting from the comparison unit 555.

Instead of using sgn(I) (where "sgn" indicates the sign or signum function) of the first epoch to demodulate the sign of the IQ accumulation signal 226 at the first epoch and sgn(I) of the IQ accumulation signal 226 at the second epoch to demodulate the sign of the IQ accumulation signal 226, IQ sign demodulation system 530 uses both I components 521 and 523, sampled at the first and the second epoch respectively, and both Q components 531 and 533, sampled at the first and the second epoch, respectively, to determine whether to use I or Q to demodulate the sign of the signals 225 and 510.

Before achieving the phase locked status, the allocation of power between the I and Q components of IQ accumulation signal 226 can be arbitrary. IQ sign demodulation system 530 measures the total energy IQ accumulation signal 226 based on the I components 521 and 523 at the first and the second epochs, respectively, and compares with the total energy based on the Q components 531 and 533, at the first and the second epochs, respectively.

A first absolute unit 524 extracts the amplitude of the I signal 521 at the first epoch producing the signal 526; a second absolute unit 525 extracts the amplitude of the I signal 523 at the second epoch producing the signal 527; a third absolute unit 534 extracts the amplitude of the Q signal 531 at the first epoch producing the signal 536; and a fourth absolute unit 535 extracts the amplitude of the Q signal 533 at the second epoch producing the signal 537. A first sum unit 528 combines the absolute value 526 of I component 521 at the first epoch with the absolute value 527 of I component 523 at the second epoch to produce signal 553 representing the total energy of the I component of IQ accumulation signal 226; and a second sum unit 538 combines the absolute value 536 of Q component 531 at the first epoch with the absolute value 537 of the Q component 533 at the second epoch to produce signal 554 representing the total energy of the Q component of IQ accumulation signal 226.

$$\text{Sum}_{553} = |I_{521}| + |I_{523}| \qquad \text{Equation 7}$$

$$\text{Sum}_{554} = |Q_{531}| + |Q_{533}| \qquad \text{Equation 8}$$

If the total energy of the I component, signal 553, is larger than the total energy of the Q component, signal 554, over the first and the second epoch, as determined by comparator 555, the sgn(I) signal 529 is selected as the sign 556 of the IQ accumulation signal 226 at the first epoch, and the sgn(I) signal 551 is selected as the sign (557) of the IQ accumulation signal 520 at the second epoch. Otherwise, if the signal 553 is less than the signal 554, as determined by comparator 555, the sgn(Q) signal 539 is selected as the sign 556 of the IQ accumulation signal 226 at the first epoch, and the sgn(Q) signal 552 is selected as the sign 557 of the IQ accumulation signal 520 (e.g., the sign of the sample) at the second epoch. The resulting signals 556 and 557 are used to control multiplexers 503 and 513, respectively, in frequency error detection system 421, FIG. 7, which in turn is used in clock tracking loop 230, as shown in FIG. 4 and FIG. 6, of GNSS channel module 121 (see FIG. 3 and FIG. 4).

$$\text{if Sum}_{553} \geq \text{Sum}_{554} \text{ then } \begin{cases} \text{sgn}_{556} = \text{sgn}(I_{521}) \\ \text{sgn}_{557} = \text{sgn}(I_{523}) \end{cases} \qquad \text{Equation 9}$$

$$\text{if Sum}_{553} < \text{Sum}_{554} \text{ then } \begin{cases} \text{sgn}_{556} = \text{sgn}(Q_{531}) \\ \text{sgn}_{557} = \text{sgn}(Q_{533}) \end{cases} \qquad \text{Equation 10}$$

Figure 9A:
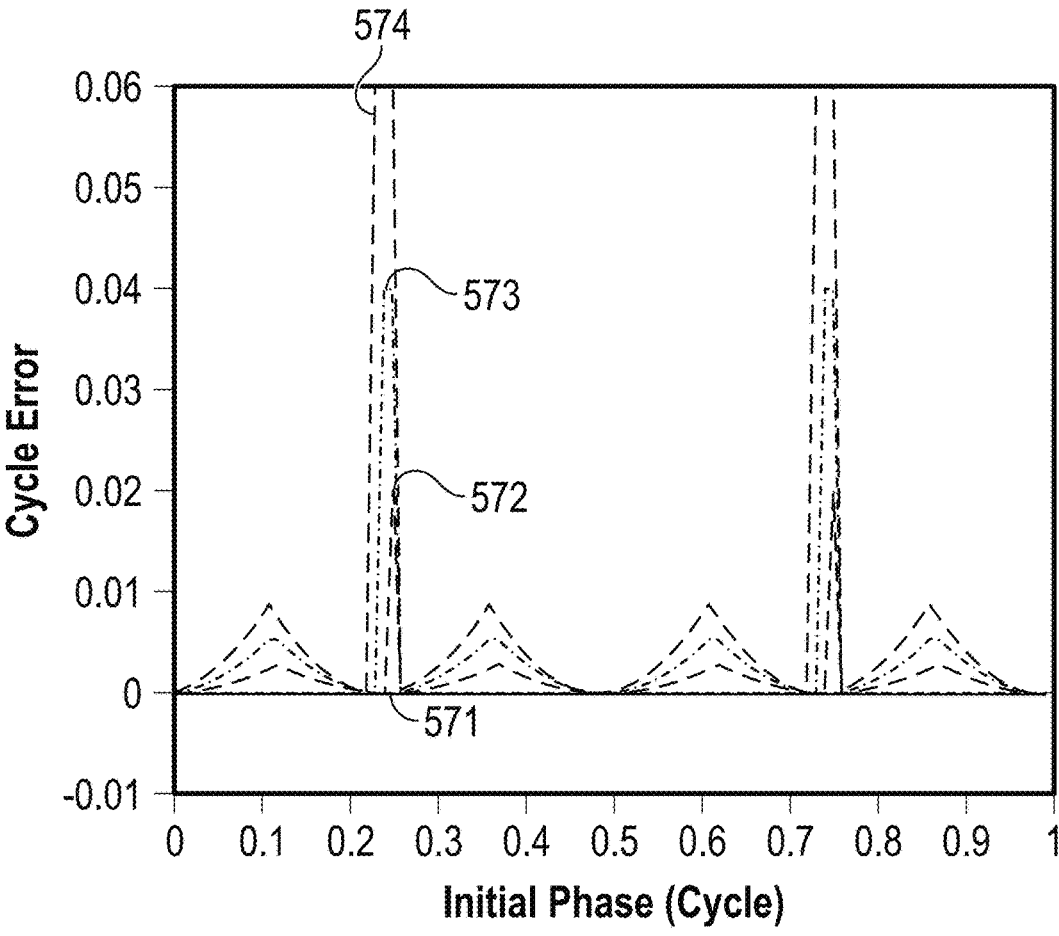
FIGS. 9A-9B illustrate prophetic (i.e., simulated) data showing an improvement in frequency tracking using the disclosed embodiments.
Figure 9B:
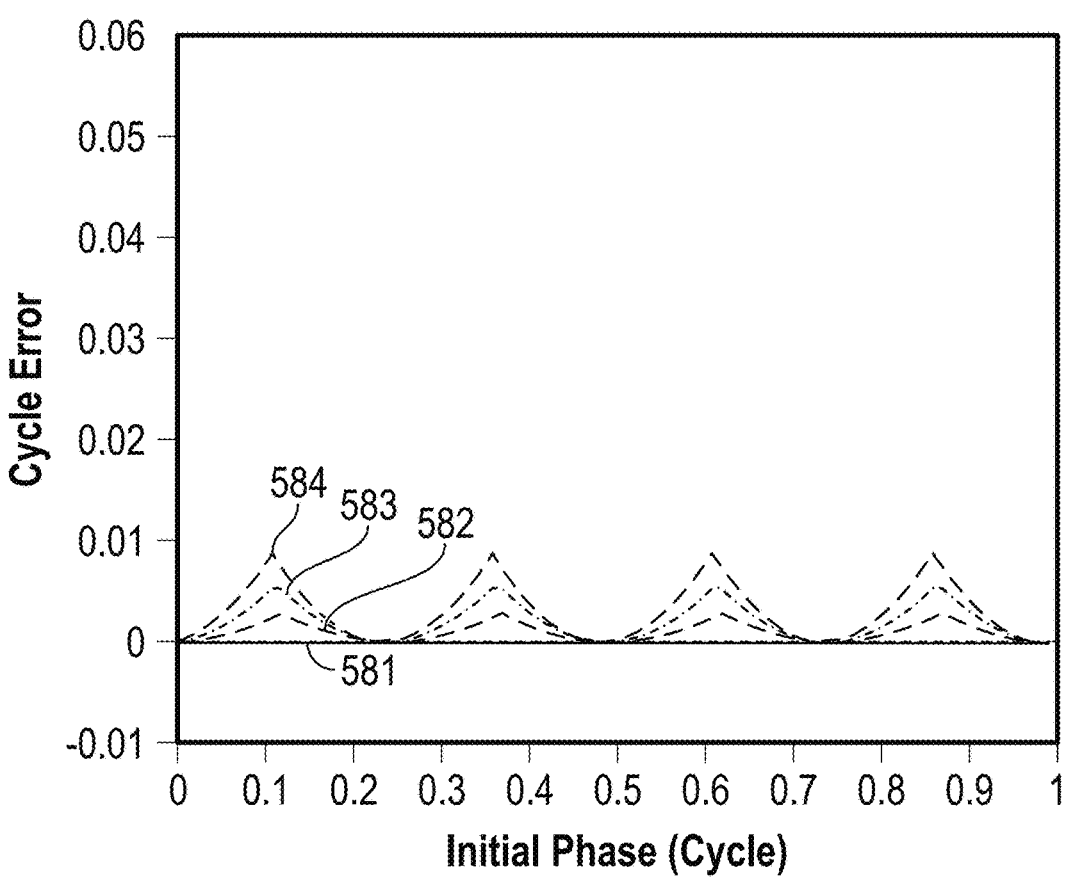

FIGS. 9A-9B illustrate prophetic (i.e., simulated) data 900 showing an improvement in frequency tracking using the disclosed embodiments. FIGS. 9A-9B illustrate the accuracy improvement using Equation 7 to Equation 10 compared with using sgn($I_{521}$) and sgn($I_{522}$) to control the multiplexers of the frequency error detection system 421. The signals 571-574 (FIG. 9A) illustrate the frequency detector error using sgn(j) to remove data modulation at four normalized input frequencies, where the x axis is the initial phase and the y axis is the difference between the estimated frequency and the true input frequency. Comparing with the maximum error using only sgn(I), the signals 581-584 (FIG. 9B) show an improvement of almost ten times in accuracy by using both I and Q components of IQ accumulation signal 226 to control the multiplexers of the frequency error detection system 421, as listed in Table 3.

TABLE 3

| Norm Freq | Line type (Ref) | Signal (using I) | Max FD Err (using I) | Signal (using I and Q) | Max FD Err (using I and Q) |
|---|---|---|---|---|---|
| 0 | Solid | 571 | 0 | 581 | 0 |
| 0.01 | Wide dash | 572 | 0.02 | 582 | 0.003 |
| 0.02 | Alternating wide-narrow dash | 573 | 0.04 | 583 | 0.005 |
| 0.03 | Wide dash | 574 | 0.06 | 584 | 0.008 |

Figure 10:
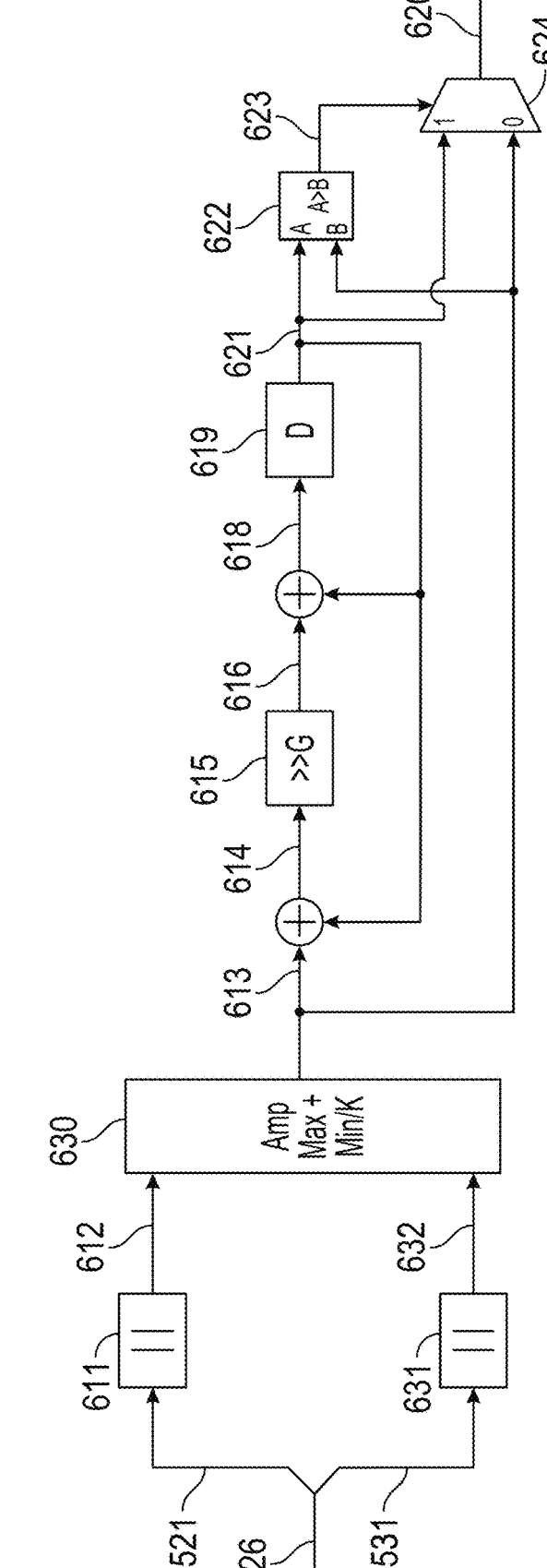
FIG. 10 is a block diagram of circuitry for performing an amplitude calculation, in accordance with some embodiments.

FIG. 10 is a block diagram of first amplitude calculation unit 426 (or, equivalently, second amplitude calculation unit 436, see FIG. 6), in accordance with some embodiments. First amplitude calculation unit 426 is configured to detect a sudden amplitude increase due to latency in the AGC response. The signal 521 is the I component of the IQ accumulation signal 226 at the first epoch, whose amplitude is extracted by a first absolute unit 611 to produce signal 612 representing the amplitude of the I component 521 of IQ accumulation signal 226. The signal 531 is the Q component of the IQ accumulation signal 226 at the first epoch, whose amplitude is extracted by a second absolute unit 631 to produce signal 632 representing the amplitude of the Q component 531 of IQ accumulation signal 226. Amplitude calculation unit 630 generates an amplitude signal 613 at the first epoch from signals 612 and 632. A register 619 stores a filtered amplitude 621 estimated at $0^{th}$ epoch (the previous epoch) which is subtracted from the amplitude signal 613 to obtain a difference signal 614. A gain unit 615 discounts changes in the difference signal 614 (e.g., using low pass filtering) to produce a filtered difference 616, which is used (e.g., by summing with filtered amplitude 621 from the prior epoch) to update the filtered amplitude 621 from the $0^{th}$ epoch to a filtered amplitude 618 at the first epoch, which is stored at register 619.

In some circumstances, the amplitude of the sample can increase suddenly because the wideband AGC does not reduce the gain enough to smoothly control changes in the amplitude signal 613 or 621 of an individual GNSS band. Under such circumstances, the amplitude signal 613 at the first epoch can be much larger than (e.g., more than 2, 4, 6 or 8 times) the filtered amplitude 621 generated for the prior epoch. For example, in some circumstances the amplitude of the Q component 632 at the first epoch is proportional to the amplitude signal 613. If the Q component is large enough relative to the filtered amplitude 621, the stability of the clock tracking loop will be negatively impacted. Therefore, a comparator 622 turns on a signal 623 once the amplitude signal 613 (e.g., the instantaneous signal) is greater than the filtered amplitude 621, and in that circumstance the amplitude signal 613 is assigned, by MUX 624, to signal 620, which drives the clock tracking loop.

Figure 11:
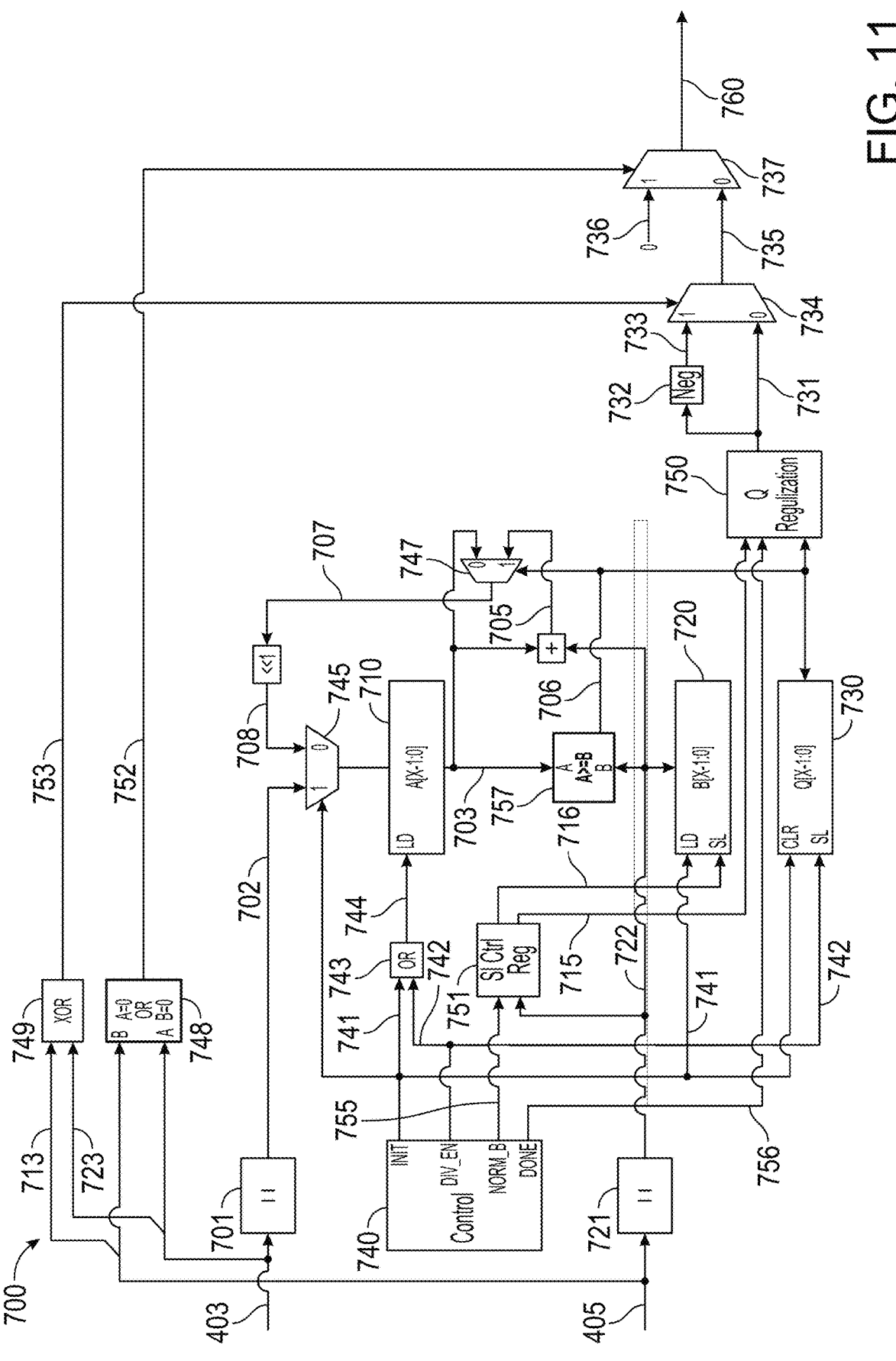
FIG. 11 is a block diagram of a hardware division subsystem (e.g., circuitry) for performing division, in accordance with some embodiments.

FIG. 11 is a block diagram of a hardware division subsystem 700 for performing a division algorithm, in accordance with some embodiments. In particular, FIG. 11 illustrates a radix-2 based divider (e.g., an example of divider 404, FIG. 6) which enables fully automated clock tracking in an ASIC without interacting with a baseband task running on the CPU (e.g., a hardware processor, such as CPU 2202, that executes one or more programs of a navigation module 2218, FIG. 2) of the navigation system. The frequency error signal 403 represents the dividend and the normalization signal 405 represents the divisor. In order to simplify the core division processing, the core algorithm deals with positive inputs, where an absolute unit 701 extracts the amplitude of the frequency error signal 403 and the absolute unit 721 extracts the amplitude of the divisor signal 405. Therefore, the resultant absolute quotient signal 731 is a positive number. A negative unit 732 is used to obtain the negative value 733 of the quotient signal 731. The sign of the quotient is decided by sign signal 753, which is generated by comparing the sign (723) of the frequency error signal 403 and the sign (713) of the normalization signal 405 using an XOR (eXclusive OR) unit 749. The sign signal 753 controls a multiplexer 734 to select the correctly signed quotient signal 735.

The division algorithm prevents "divide by zero" malfunctions by including a check unit 748 that inspects the frequency error signal 403 and normalization signal 405. If either signal is 0, where the divisor signal 405 (also called the normalization signal) should not be 0, signal 752 is set to select zero signal 736 (via multiplexer 737) as the final quotient 760.

The core division algorithm is controlled by a scheduling module 740 which divides the division algorithm into four stages: initialization, denominator normalization, division calculation, and completion. Registers 710 (A), 720 (B), and 730 (Q) all store positive numbers, e.g., the $(X-1)^{th}$ bit of each stored number is "0".

At the initialization stage, an initialization enable signal 741 selects the X−1 bit absolute value of the numerator 702, and loads it into register 710, selects the X−1 bit absolute value of denominator signal 722, and loads it into register 720, and resets the X−1 bit quotient register 730 to a predefined value, such as zero.

At the denominator normalization stage, signal 755 enables the left shift control module 751. The left shift control module 751 detects the $X-2^{th}$ bit of the denominator signal 722 and enables the left shift signal 716 as long as the $X-2^{th}$ bit is NOT equal to one. The number of left shifts of the denominator is counted by the left shift control module 751 and that number is output by module 751 as signal 715. The raw denominator is denoted in FIG. 11 as B, which is left shifted by L bits (where L is the value of signal 715), resulting in a denominator of $B*2^L$.

Once the normalization stage completes, the DIV_EN signal 742 is set to enable the radix-2 based division process. While DIV_EN signal 742 is set (e.g., enabled), load signal 744 is set and signal 708 is selected by multiplexer (MUX) 745, because the initialization signal INIT is not set. At the first clock cycle of this phase of the division process, a comparator 757 compares the numerator signal 703 with the denominator signal 722. If the numerator signal 703 is smaller, signal 706 equals to 0, which is shifted into the quotient register 730, and at the same time the numerator signal 703 is selected by multiplexer (MUX) 747. Otherwise, the numerator signal 703 is equal to or larger than the denominator signal 722, the quotient bit 1 (e.g., quotient signal 706 output by comparator 757 is set to 1) is shifted into the quotient register 730, and signal 707 (output from multiplexer MUX 747) is equal to signal 705 (called the adjusted numerator), which is equal to the numerator signal 703 minus the denominator signal 722 (e.g., the absolute value of the denominator). Furthermore, the adjusted numerator 705 is loaded into register 710 via multiplexer 747 and multiplexer 745, for use as the numerator in the next iteration or cycle of the division process. This process repeats for X−1 iterations (e.g., X−1 clock cycles) until the X−1 bit quotient is stored at the quotient register 730. Due to the reloading of the adjusted numerator 705 into register 710 at the end of each iteration of the division process, the division process scales the numerator 702 by $2^{X-1}$, and thus the numerator used in the division process is equivalent to $A*2^{X-1}$, where A is the absolute value 702 of the original numerator signal 403.

After the radix-2 division process completes, the DONE signal 756 is set by scheduling module 740 and the quotient is scaled by module 750. As discussed above, the normalization stage scales the denominator signal 722 to $B*2^L$. Similarly discussed above, the division stage scales the numerator 702 by $2^{X-1}$. Therefore the equivalent division by this radix 2 algorithm is:

$$REG_{730} = \frac{A \cdot 2^{X-1}}{B \cdot 2^L} = \left(\frac{A}{B}\right)2^{X-1-L}, \qquad \text{Equation 11}$$

Once the division completion triggers the DONE signal 756, module 750 scales the data at quotient register 730 by $2^{-(X-1-L)}$ to obtain the quotient $$\left(\frac{A}{B}\right),$$

output by module 750 as absolute quotient signal 731.

Figure 12:
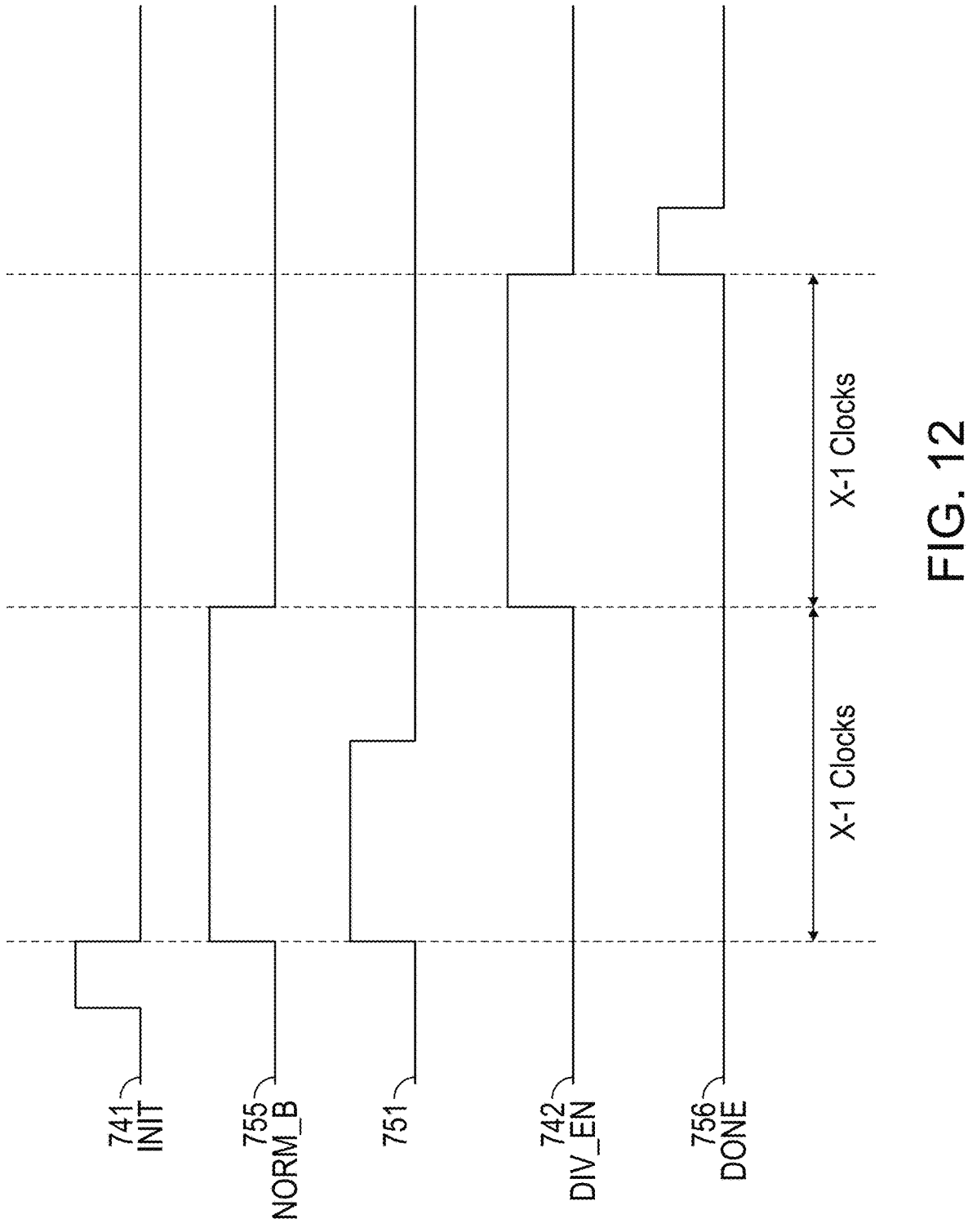
FIG. 12 is a timing diagram illustrating a variety of task scheduling sequences for the system for performing division using the hardware division subsystem of FIG. 11, in accordance with some embodiments.

FIG. 12 illustrates a variety of task scheduling sequences for the divisional algorithm implemented using the circuitry (hardware division subsystem 700) of FIG. 11, in accordance with some embodiments. FIG. 12 illustrates state transitions implemented by the scheduling module 740. The subsystem starts with the initialization stage as shown by initialization enable signal 741 for one clock; then the NORM processes is enabled by signal 755 for X−1 clocks, over which the left shift control module 751 for normalizing the denominator is enabled until the $(X-2)^{th}$ bit of the denominator register 720 is set to 1; the division algorithm is enabled for the next X−1 clocks as shown by DIV_EN signal 742; finally the DONE signal 756 triggers the quotient scaling and selection processes, including the negative selection and the singularity selection operations performed using multiplexors 734 and 737, as described above.

FIG. 13 depicts a flowchart of a method 1300 for navigating a mobile object according to signals from satellites, according to some embodiments. Method 1300 may be implemented by or performed at (1302) mobile object (e.g., mobile object system 2200). Portions of method 1300 may be performed under the control of instructions stored in memory 2210 (FIG. 2) that are executed by one or more processors (processors 2202, FIG. 2) of moving object system 2200. The operations executed by one or more processes correspond to computer readable instructions stored in a computer readable storage medium of memory

2210 in mobile object system 2200. The computer readable instructions are in source code, assembly language code, object code, or other instruction format that is interpreted and/or executed by the one or more processors 2202 of mobile object system 2200. Other operations of method 1300 are implemented in hardware, e.g., on an application-specific integrated circuit (ASIC) of the mobile object 2200.

The mobile object receives (1302) satellite navigation signals from a plurality of satellites. In some embodiments, the mobile object simultaneously receives satellite navigation signals from a plurality of constellations of satellites (e.g., GPS, GLONASS, BeiDou, etc.). In some embodiments, the mobile object receives a plurality of signals from the same satellite. For example, the mobile object receives two GPS C/A signals from a GPS satellite (corresponding to high and low frequency bands, such as L1 and L2), and two GPS P-code signals from the same GPS satellite. Each signal from each satellite is processed by a different channel.

Using one or more of the satellite navigation signals from the plurality of satellites, for each respective channel of a plurality of channels, the mobile object: generates (1304) an estimate of clock error of a clock of the mobile object (e.g., a receive clock) using a first error correction stage; and generates an estimate of a respective carrier tracking error for the respective channel using a second error correction stage that is distinct from the first error correction stage. For example, in FIG. 4, the first error correction stage includes first stage demodulator 218 and correlator 224, and the second error correction stage includes second stage demodulator 219 and correlator bank 223. In FIG. 5, the first error correction stage includes NCO 301, first complex de-rotator 324, and correlation accumulator unit 316, and the second error correction stage includes NCO 302, second complex de-rotator 325, and correlation accumulator unit 315.

In some embodiments, for each respective channel of a plurality of channels, the mobile object generates an estimate of a line of sight Doppler error for the respective channel using the first error correction stage. For example, the estimate of the line of sight (LOS) Doppler error may be based on an external sensor such as an IMU (e.g., external sensor 204, FIG. 4) or based on a velocity estimate of the mobile object (e.g., using vector tracking module 205, FIG. 4). The estimate of the clock error is based at least in part on the line of sight Doppler error for the respective channel. For example, after the LOS Doppler error is removed, the common (e.g., average) error across all channels is assumed to be the clock error.

In some embodiments, the estimate of clock error of the clock of the mobile object and the estimate of the respective carrier tracking error for each of the plurality of channels is generated using an application-specific integrated circuit (ASIC) of the mobile object.

In some embodiments, the estimate of the clock error is generated at a first rate (e.g., every millisecond) and the estimate of the respective carrier tracking error for each of the plurality of channels is generated at a second rate that is slower than the first rate (e.g., every five milliseconds). If a single stage of demodulation were used to generate estimates of both errors, correcting the clock error more often than the carrier signal would result in the two signals drifting in opposite directions, because corrections to the clock error are effectively double counted in the carrier tracking error for each of the plurality of channels. The dual-stage demodulation described herein solves this problem by decoupling the two stages. For example, in some embodiments, the first error correction stage is decoupled from an output of the second error correction stage (e.g., as shown in the embodiments of FIG. 4 and FIG. 5). In some embodiments, the second error correction stage is decoupled from an output of the first error correction stage (e.g., as shown in the parallel arrangement in the embodiments of FIG. 5).

In some embodiments, the first error correction stage includes a first accumulator (e.g., correlation accumulator 316, FIG. 5) and the second error correction stage includes a second accumulator that is distinct from the first accumulator (e.g., correlation accumulator 315, FIG. 6).

In some embodiments, the first accumulator produces a first accumulation signal (e.g., IQ accumulation signal 225, FIG. 4) that is provided to a clock tracking loop (e.g., clock tracking loop 230, FIG. 4). In some embodiments, an accumulation signal from the first stage of each of a plurality of channels is provided to the clock tracking loop.

In some embodiments, the second accumulator produces a second accumulation signal (e.g., IQ accumulation signal 226) that is used to drive the code and carrier tracking loops. For example, in FIG. 4, IQ accumulation signal 226 is fed to clock tracking loop 230 as well as to the vector tracking module 205 and GNSS channel processing module 211, which includes a carrier tracking loop and a code tracking loop for each channel.

In some embodiments, the second accumulation signal is fed to the clock tracking loop to remove a sign ambiguity resulting from data embedded in the satellite navigation signal processed by the respective channel (e.g., as described with respect to FIG. 6). For example, the data overlayed on the satellite navigation signal will typically include an emphemeris and an almanac.

In some embodiments, the second accumulation signal is further fed back to a channel tracking loop of the respective channel. For example, in FIG. 4, IQ accumulation signal 226 is fed to both vector tracking module 205 as well as clock tracking loop 230.

In some embodiments, the first error correction stage comprises a first numerically-controlled oscillator (NCO) (e.g., first numerically controlled oscillator (NCO) 301, FIG. 5) and the second error correction stage comprises a second NCO that is distinct from the first NCO (second numerically controlled oscillator (NCO) 302).

In some embodiments the second accumulation signal is further fed back to a channel tracking loop of the respective channel and the channel tracking loop of the respective channel comprises a local code replica generator that includes a third NCO. For example, the channel tracking loop shown in FIG. 5 includes NCO 306 and PN coder 309.

In some embodiments, the second error correction stage comprises a phase-locked loop. Further, the NCO 306, PN code 309, and correlation accumulator 315 form a PN code loop, which aligns the local PN sequence with the PN sequence in the received satellite navigation signal.

In accordance with the estimate of the clock error and the estimate of the respective carrier tracking error for each of the plurality of channels, the mobile object 2200 computes (1308) position and velocity estimates for the mobile object.

The mobile object performs (1310) a navigation function (e.g., routing of the mobile object; displaying on a map one or more suggested routes for moving the mobile object from a current location to a specified or target location; and/or providing information regarding locations nearby the mobile object or along a propose route of the mobile object) for the mobile object in accordance with the computed position and velocity estimates for the mobile object.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A navigation module for a mobile object, comprising:
one or more processors;
a satellite receiver to receive satellite navigation signals from a plurality of satellites;
a plurality of channel tracking loops, each channel tracking loop of the plurality of channel tracking loops corresponding to a respective channel of a plurality of channels and having a first error correction stage and a second error correction stage, wherein each channel tracking loop processes a corresponding satellite navigation signal of the received satellite navigation signals and is configured to:
generate an estimate of clock error of a clock of the mobile object using a first error correction stage of the respective channel; and
generate an estimate of a respective carrier tracking error for the respective channel using a second error correction stage of the respective channel that is distinct from the first error correction stage of the respective channel, wherein:
the estimate of the clock error is generated at a first rate and the estimate of the respective carrier tracking error for each of the plurality of channels is generated at a second rate that is slower than the first, and
in a respective channel tracking loop of the plurality of channel tracking loops, the first error correction stage of the respective channel is decoupled from an output of the second error correction stage of the respective channel;
a navigation application module configured to:
in accordance with the estimate of the clock error and the estimate of the respective carrier tracking error for each of the plurality of channels, compute position and velocity estimates for the mobile object; and
perform a navigation function for the mobile object in accordance with the computed position and velocity estimates for the mobile object.

2. The navigation module of claim 1, wherein each channel tracking loop is further configured to:
generate an estimate of a line of sight Doppler error for the respective channel using the first error correction stage of the respective channel,
wherein the estimate of the clock error is based at least in part on the line of sight Doppler error for the respective channel.

3. The navigation module of claim 1, wherein the plurality of channel tracking loops are integrated on and executed by an application-specific integrated circuit (ASIC).

4. The navigation module of claim 1, wherein, in a respective channel tracking loop of the plurality of channel tracking loops, the second error correction stage of the respective channel is decoupled from an output of the first error correction stage of the respective channel.

5. The navigation module of claim 1, wherein, in a respective channel tracking loop of the plurality of channel tracking loops, the first error correction stage of the respective channel includes a first accumulator and the second error correction stage of the respective channel includes a second accumulator that is distinct from the first accumulator.

6. The navigation module of claim 5, wherein the first accumulator, in a respective channel tracking loop of the plurality of channel tracking loops, produces a first accumulation signal that is fed to a clock tracking loop.

7. The navigation module of claim 6, wherein, each channel of the plurality of channels processes a corresponding satellite navigation signal of the received satellite navigation signals and includes a corresponding channel tracking loop of the plurality of channel tracking loops; and, the second accumulator in a respective channel tracking loop of the plurality of channel tracking loops produces a second accumulation signal that is used to generate a local code signal and local carrier signals that are used to demodulate a satellite navigation signal, of the received satellite navigation signals, corresponding to the respective channel tracking loop.

8. The navigation module of claim 7, wherein the second accumulation signal is fed to the clock tracking loop to remove a sign ambiguity resulting from data overlayed on a satellite navigation signal processed by the respective channel.

9. The navigation module of claim 7, wherein the second accumulation signal is further fed back to a channel tracking loop of the respective channel.

10. The navigation module of claim 7, wherein the first error correction stage of the respective channel comprises a first numerically-controlled oscillator (NCO) and the second error correction stage of the respective channel comprises a second NCO that is distinct from the first NCO.

11. The navigation module of claim 10, wherein the second accumulation signal is further fed back to a channel tracking loop of the respective channel and the channel tracking loop of the respective channel includes a local code replica generator that includes a third NCO distinct from the first NCO and the second NCO.

12. The navigation module of claim 1, wherein a carrier tracking loop of the respective channel comprises a phase-locked loop.

13. A method for navigating a mobile object according to signals from satellites, the method comprising:
at the mobile object,
receiving satellite navigation signals from a plurality of satellites;
for each respective channel of a plurality of channels, processing a corresponding satellite navigation signal of the received satellite navigation signals, the processing of the corresponding satellite navigation signal including:
generating an estimate of clock error of a clock of the mobile object using a first error correction stage of the respective channel;
generating an estimate of a respective carrier tracking error for the respective channel using a second error correction stage of the respective channel that is distinct from the first error correction stage of the respective channel, wherein:
the estimate of the clock error is generated at a first rate and the estimate of the respective carrier tracking error for each of the plurality of channels is generated at a second rate that is slower than the first, and
in a respective channel tracking loop of the plurality of channel tracking loops, the first error correction stage of the respective channel is decoupled from an output of the second error correction stage of the respective channel;

in accordance with the estimate of the clock error and the estimate of the respective carrier tracking error for each of the plurality of channels, computing position and velocity estimates for the mobile object; and performing a navigation function for the mobile object in accordance with the computed position and velocity estimates for the mobile object.

14. The method of claim 13, further including for each respective channel of a plurality of channels:

generating an estimate of a line of sight Doppler error for the respective channel using the first error correction stage of the respective channel, wherein the estimate of the clock error is based at least in part on the line of sight Doppler error for the respective channel.

15. The method of claim 13, wherein the estimate of clock error of the clock of the mobile object and the estimate of the respective carrier tracking error for each of the plurality of channels is generated using an application-specific integrated circuit (ASIC) of the mobile object.

16. The method of claim 13, wherein the second error correction stage of the respective channel is decoupled from an output of the first error correction stage of the respective channel.

* * * * *